(12) United States Patent
Kurihara et al.

(10) Patent No.: US 8,354,470 B2
(45) Date of Patent: Jan. 15, 2013

(54) OLEFIN POLYMER WAX-CONTAINING RESIN COMPOSITION

(75) Inventors: Mai Kurihara, Ichihara (JP); Kuniaki Kawabe, Ichihara (JP); Akinori Etoh, Ichihara (JP); Toshiyuki Itou, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 12/996,963

(22) PCT Filed: Jun. 12, 2009

(86) PCT No.: PCT/JP2009/060783
§ 371 (c)(1),
(2), (4) Date: Dec. 8, 2010

(87) PCT Pub. No.: WO2009/154152
PCT Pub. Date: Dec. 23, 2009

(65) Prior Publication Data
US 2011/0092642 A1 Apr. 21, 2011

(30) Foreign Application Priority Data

Jun. 17, 2008 (JP) .................. 2008-158559
Aug. 8, 2008 (JP) .................. 2008-205075

(51) Int. Cl.
*C08L 69/00* (2006.01)
*C08L 77/00* (2006.01)
(52) U.S. Cl. ......... 524/606; 524/612; 525/222; 525/240
(58) Field of Classification Search .................. 524/606, 524/612; 525/222, 240
See application file for complete search history.

(56) References Cited

U.S. PATENT DOCUMENTS

| | | |
|---|---|---|
| 6,335,410 B1 | 1/2002 | Finlayson et al. |
| 6,348,527 B1 | 2/2002 | Nodera |
| 6,723,810 B2 | 4/2004 | Finlayson et al. |

FOREIGN PATENT DOCUMENTS

| | | |
|---|---|---|
| EP | 0 203 799 A1 | 12/1986 |
| EP | 0 203 799 A1 * | 12/1986 |
| EP | 1 043 339 A1 | 10/2000 |
| JP | 61-098780 | 5/1986 |
| JP | 61-211315 | 9/1986 |
| JP | 5-169460 | 7/1993 |
| JP | 05-301915 | 11/1993 |
| JP | 10-168294 | 6/1998 |
| JP | 2000-063649 | 2/2000 |
| JP | 3255697 B2 | 11/2001 |
| JP | 2003-262711 | 9/2003 |
| JP | 2005-171146 | 6/2005 |
| JP | 2005-247942 | 9/2005 |
| JP | 2005-281449 | 10/2005 |
| JP | 2006-245173 | 9/2006 |
| JP | 2006-342290 | 12/2006 |
| JP | 2008-095112 | 4/2008 |
| WO | WO-99/33882 A1 | 7/1999 |

OTHER PUBLICATIONS

International Search Report in PCT/JP2009/060783 dated Oct. 27, 2009.
Communication (Supplementary EP Search Report) in EP Appln No. 09766600.2 dated Jun. 27, 2011.
Huthig, et al. "Die Makromolekulare Chemie Macromolecular Symposia", Makromol. Chem., Macromol. Symp., 1991, vol. 48/49, pp. 317-332.

* cited by examiner

*Primary Examiner* — Robert D. Harlan
(74) *Attorney, Agent, or Firm* — Foley & Lardner LLP

(57) ABSTRACT

Resin compositions of the invention contain an olefin polymer wax having higher heat resistance than achieved heretofore, high compatibility with resins and excellent mold-releasing properties.
A resin composition (X) of the invention is obtained by blending a resin (A) having a melting point Tm of not less than 200° C. and an olefin polymer wax component (B), the olefin polymer wax component (B) including a cyclic olefin polymer wax (B-1) having structural units (a) and (b) described below, the cyclic olefin polymer wax (B-1) containing the structural units (b) at 0.05 to 50 mol % based on all the structural units in the polymer;
(a) units derived from ethylene
(b) units derived from a cyclic olefin.

15 Claims, No Drawings

OLEFIN POLYMER WAX-CONTAINING RESIN COMPOSITION

TECHNICAL FIELD

The present invention relates to resin compositions that contain an olefin polymer wax having a cyclic structure. The invention also relates to resin compositions to be shaped containing the olefin polymer wax and an inorganic reinforcing material.

BACKGROUND ART

In the shaping of synthetic resins such as polyolefin resins, polyurethane resins, epoxy resins and polyamide resins, additives such as waxes are used to enhance releasability of shaped articles from a mold or to improve flowability during the production of shaped articles.

Known such additives or releasing agents are such natural waxes as paraffin waxes, montan waxes and derivatives of these waxes, and such synthetic waxes as higher fatty acid ester waxes and polyolefin waxes containing ethylene or propylene as essential ingredient (for example, polyethylene waxes, polypropylene waxes). These waxes are inexpensive and provide good shaping processability and good surface conditions, finding wide use. However, the natural waxes, for example montan waxes, have a problem in stable supply because the extractability thereof from minerals is unstable.

Releasing agents based on fluorine, silicone or copolymer thereof allow for excellent mold-releasing properties because of their low critical surface tension and can maintain the mold-releasing properties for long term (Patent Literatures 1 and 2). Although these additives provide good shaping processability or mold-releasing properties in the shaping of synthetic resins, they have low compatibility with the resins and consequently separate and diffuse after the shaping to bleed out on the surface of shaped articles. The bleed out deteriorates the appearance and can adversely affect secondary processability (e.g., printing, coating). Further, many of the releasing agents based on fluorine, silicone or copolymer thereof are generally expensive compared to the wax-based releasing agents. These existing releasing agents have defects as described above, and there have been no resin compositions which contain a satisfactory releasing agent in terms of both shaping processability and secondary processability on the surface of shaped articles.

CITATION LIST

Patent Literature 1: JP-A-H05-169460
Patent Literature 2: JP-A-2003-262711

SUMMARY OF INVENTION

Technical Problem

The natural waxes and the synthetic waxes are oxidized and decomposed when overheated at or above certain temperatures. The decomposition lowers the melting point of the wax, increases the oil content or the viscosity, and causes lowered properties such as deteriorated color hue. In particular, discoloration and black dots are caused in the shaping of synthetic resins having a high shaping temperature, for example polyamides.

It is therefore an object of the present invention to provide resin compositions that contain an olefin polymer wax having higher heat resistance than achieved heretofore and having high compatibility with resins and excellent mold-releasing properties. It is another object of the invention to provide resin compositions that contain an olefin polymer wax and are free from deteriorations in mechanical properties of the obtainable shaped articles therefrom.

Solution to Problem

The present inventors studied diligently to solve the above problems. They have then found that a heat-resistant olefin polymer wax having a cyclic structure may be blended into a high-melting resin to improve shaping processability of the synthetic resin and improve secondary processability of shaped articles therefrom. In particular, it has been found that the blending of such olefin polymer waxes suppresses discoloration or oxidation decomposition in the shaping at high temperatures. The present invention has been completed based on the findings. In detail, the present invention is concerned with the following.

[1] A resin composition (X) obtained by blending a resin (A) having a melting point Tm of not less than 200° C. and an olefin polymer wax component (B), the olefin polymer wax component (B) comprising a cyclic olefin polymer wax (B-1) comprising structural units (a) and (b) described below, the cyclic olefin polymer wax (B-1) containing the structural units (b) at 0.05 to 50 mol % based on all the structural units in the polymer;

(a) units derived from ethylene
(b) units derived from a cyclic olefin.

[2] The resin composition (X) described in [1], wherein the cyclic olefin polymer wax (B-1) further comprises structural units (c) described below and contains the structural units (c) at 0.01 to 15 mol % based on all the structural units in the polymer;

(c) units derived from a linear or branched C3-C20 olefin.

[3] The resin composition (X) described in [1] or [2], wherein the olefin polymer wax component (B) is blended at 0.01 to 10 parts by weight based on 100 parts by weight of the resin (A).

[4] The resin composition (X) described in any one of [1] to [3], wherein the cyclic olefin polymer wax (B-1) satisfies (Bi) to (Bv) below:

(Bi) the content of the units derived from a cyclic olefin is 0.1 to 4.0 units per molecule of the polymer;
(Bii) the density is in the range of 870 to 980 kg/m$^3$;
(Biii) the melting point is in the range of 70 to 130° C.;
(Biv) the number average molecular weight is in the range of 400 to 5,000;
(Bv) the ratio of the weight average molecular weight (Mw) to the number average molecular weight (Mn), (Mw/Mn), is not more than 4.0.

[5] The resin composition (X) described in [4], wherein the cyclic olefin polymer wax (B-1) further satisfies (Bvi) below:

(Bvi) the 10% weight loss temperature T according to TGA is not less than 350° C., or the 10% weight loss temperature T according to TGA and the weight average molecular weight Mw satisfy Formula (I) below:

$$T \geq 0.002 \times Mw + B \quad (I)$$

(wherein the value B (° C.) is 320).

[6] The resin composition (X) described in any one of [1] to [5], wherein the structural units (b) in the cyclic olefin polymer wax (B-1) are units (b') derived from a cyclic polyene.

[7] The resin composition (X) described in any one of [1] to [6], wherein the olefin polymer wax component (B) comprises a cyclic olefin polymer wax (B-1') obtained by modifying the cyclic olefin polymer wax (B-1), and wherein the cyclic olefin polymer wax (B-1') comprises structural units (a) and (b'') below wherein the content of the structural units (b'') is 0.05 to 50 mol % based on all the structural units in the polymer:

(a) units derived from ethylene (b'') units which are derived from a cyclic olefin and in which an unsaturated group has been modified; and the cyclic olefin polymer wax satisfies (Bi') below:

(Bi') the content of the units derived from a cyclic olefin is 0.1 to 4.0 units per molecule of the polymer.

[8] The resin composition (X) described in [7], wherein the cyclic olefin polymer wax (B-1') further satisfies (Bvi') below:

(Bvi') the 10% weight loss temperature T according to TGA is not less than 350° C., or the 10% weight loss temperature T according to TGA and the weight average molecular weight Mw satisfy Formula (I) below:

$$T \geq 0.002 \times Mw + B \qquad (I)$$

(wherein the value B (° C.) is 320).

[9] The resin composition (X) described in [7] or [8], wherein the structural units (b'') are units (b''') which are derived from a cyclic polyene and in which an unsaturated group has been acid-modified.

[10] The resin composition (X) described in any one of [1] to [9], wherein the olefin polymer wax component (B) further comprises a non-cyclic olefin polymer wax (B-2).

[11] The resin composition (X) described in [10], wherein the non-cyclic olefin polymer wax (B-2) has a number average molecular weight in the range of 500 to 5,000.

[12] The resin composition (X) described in [10] or [11], wherein the ratio of the cyclic olefin polymer wax (B-1) and the non-cyclic olefin polymer wax (B-2) is 10:90 to 99:1 (wt %).

[13] The resin composition (X) described in any one of [10] to [12], wherein the non-cyclic olefin polymer wax (B-2) is an ethylene/(meth)acrylic acid copolymer.

[14] The resin composition (X) described in any one of [1] to [13], wherein at least one olefin polymer wax of the olefin polymer wax component (B) is a metal salt wax.

[15] The resin composition (X) described in [14], wherein the metal in the metal salt wax is at least one selected from K, Na, Ca and Zn.

[16] The resin composition (X) described in any one of [1] to [15], wherein the resin (A) has Tg in the range of 0 to 500° C.

[17] The resin composition (X) described in any one of [1] to [16], wherein the resin (A) is selected from polyamides and polycarbonates.

[18] The resin composition (X) described in any one of [1] to [17], which further comprises an inorganic reinforcing material (E) in an amount of 5 to 250 parts by weight based on 100 parts by weight of the resin (A).

[19] A shaped article produced from the resin composition (X) described in any one of [1] to [18].

Advantageous Effects of Invention

According to the present invention, the polyolefin waxes having a cyclic structure achieve excellent compatibility with resins and are resistant to oxidation decomposition even in the shaping of synthetic resins at high temperatures, thereby preventing the discoloration of the resins or the occurrence of black dots. Further, the polyolefin waxes give sufficient flowability to the molten resins and achieve higher shaping properties. The resin compositions of the present invention have high utility such as good mold-releasing properties and excellent secondary processability and surface properties of the shaped articles therefrom.

DESCRIPTION OF EMBODIMENTS

The present invention will be described in detail below.

<<Resin Compositions (X)>>

A resin composition (X) according to the present invention is obtained by blending a resin (A) having a melting point Tm of not less than 200° C. and an olefin polymer wax component (B) comprising an olefin polymer wax (B-1) and/or an olefin polymer wax (B-1').

The manufacturing of shaped articles having excellent heat resistance involves high-melting resins (A) (e.g., engineering plastics, super engineering plastics), and such resins (A) are shaped at high temperatures. To improve flowability of the molten resins or to improve releasability of shaped articles from a mold, conventional olefin polymer waxes have been used. However, the conventional olefin polymer waxes are still to be improved in heat resistance, and shaped articles manufactured therewith are discolored and have a bad appearance. Further, the flowability and the occurrence of smoking in the shaping still need addressing. It is a conventional practice in the shaping at a high temperature that low-molecular fatty acid metal salts such as calcium montanate are used to improve mold-releasing properties. However, such practice also causes the smoking in the shaping or the discoloration of shaped articles.

On the other hand, the resin compositions (X) according to the present invention contain in combination a resin (A) and a cyclic olefin polymer wax (B-1) and/or a cyclic olefin polymer wax (B-1'). These specific olefin polymer waxes have excellent heat resistance and prevent smoking or discoloration even in the shaping at high temperatures, and the obtainable shaped articles achieve excellent appearance. As a matter of course, the resin compositions (X) containing the specific olefin polymer wax have excellent compatibility in the high-temperature shaping, shaping properties and mold-releasing properties. Further, shaped articles manufactured with the addition of the olefin polymer waxes have mechanical properties such as impact resistance, tensile properties and flexural properties that are comparable to shaped articles produced without such waxes.

JP-A-2008-95112 discloses a wax substitute polymer, in detail a non-pourable homogeneous ultra molecular weight ethylene polymer obtained by copolymerizing ethylene with 1-octene or 1-butene. Japanese Patent No. 3255697 discloses an olefin synthetic wax having excellent low-temperature properties which comprises a copolymer of ethylene and 2-norbornene. JP-A-2006-342290 discloses a copolymer obtained by copolymerizing ethylene, propylene and vinyl-norbornene, and the copolymer is described to be used as a releasing agent for the shaping of resins. These patent literatures, however, do not describe that advantageous effects as described hereinabove are achieved by combining an olefin polymer wax (B-1) or an olefin polymer wax (B-1') with a resin (A) which is to be shaped at a high temperature.

<(Resins (A)>

The resins (A) used in the invention are thermoplastic resins having a melting point Tm of not less than 200° C. The resins (A) may be used singly, or two or more kinds may be used in combination. The definition and production processes for the thermoplastic resins are as known in the art, and may be found in publications such as "Jitsuyou Plastic Jiten (Practical Plastic Dictionary)" (edited by Jitsuyou Plastic Jiten Editorial Committee, published from Industrial Research Center of Japan). The melting point Tm is preferably not less than 205° C., more preferably not less than 210° C., and is preferably not more than 500° C., more preferably not more than 400° C., still more preferably not more than 350° C. In the specification, the melting point Tm is determined by DSC. In an exemplary Tm measurement method, approximately 10 mg of a sample is placed in an aluminum pan, the sample is then heated and molten on a differential scanning calorimeter (DSC), and the sample is subsequently cooled to 30° C. at a rate of 10° C./min and is thereafter heated at a rate of 10° C./min. An endothermic peak recorded during the second heating is obtained as the melting point. In the case of high heat resistance resins that are heat decomposed before showing Tm, the temperature which causes the heat decomposition is defined as Tm.

The resins (A) preferably have a glass transition temperature Tg in the range of 0 to 500° C. In an exemplary measurement method for the glass transition temperature, approximately 10 mg of a sample is placed in an aluminum pan, the sample is then heated and molten on a differential scanning calorimeter (DSC), and the sample is subsequently cooled to −30° C. at a rate of 10° C./min and is thereafter heated at a rate of 10° C./min. The glass transition temperature is obtained by determining the temperature at the intersection point of the baseline and an extended line drawn from a rising endothermic line.

Examples of the resins (A) include the following thermoplastic resins but are not limited thereto.

(1) Polycarbonate Resins

Polycarbonate resins used in the invention are not particularly limited, and known polycarbonate resins may be used.

Typical polycarbonate resins are obtained by reacting aromatic diols (for example, bisphenol A) and phosgene. In the present invention, diethylene glycol diallyl carbonate is preferable.

Such polycarbonate resins are commercially available, with preferred examples including NOVAREX (Mitsubishi Chemical Corporation), Panlite (TEIJIN CHEMICALS LTD.) and Lexan (GE plastics Japan Ltd.).

(2) Thermoplastic Polyester Resins

Thermoplastic polyester resins used in the invention are not particularly limited, and known thermoplastic polyester resins may be used.

Typical thermoplastic polyester resins are obtained by polycondensation of dicarboxylic acids and diols. In the present invention, polyethylene terephthalate, polybutylene terephthalate, polyethylene-2,6-naphthalene dicarboxylate and polycyclohexane terephthalate are preferable.

Such thermoplastic polyester resins are commercially available, with preferred examples including Rynite (Du Pont Kabushiki Kaisha).

(3) Polyamide Resins

Polyamide resins used in the invention are not particularly limited, and known polyamide resins may be used.

Typical polyamide resins are obtained by polycondensation of diamines and dicarboxylic acids or ring-opening polymerization of caprolactams. In the present invention, polycondensates between aliphatic diamines and aliphatic or aromatic dicarboxylic acids are preferable.

Such polyamide resins are commercially available, with preferred examples including UBE nylon (UBE INDUSTRIES, LTD.), LEONA (Asahi Kasei Corporation) and Zytel (Du Pont Kabushiki Kaisha).

(4) Polyimide Resins

Polyimide resins used in the invention are not particularly limited, and known polyimide resins may be used.

Typical polyimide resins are obtained by polycondensation of tetracarboxylic acids and diamines to form imide bonds in the main skeleton. In the present invention, polyimide resins formed from pyromellitic acid anhydride and diaminodiphenyl ether are preferable.

Such polyimide resins are commercially available, with preferred examples including Vespel (Du Pont Kabushiki Kaisha).

(5) ABS Resins

ABS resins used in the invention are not particularly limited, and known ABS resins may be used.

Typical ABS resins are impact resistant resins obtained by graft polymerization of polybutadiene with acrylonitrile and styrene. In the present invention, such resins which contain polybutadiene components at 5 to 40 wt % and in which the weight ratio of styrene components and acrylonitrile components (styrene/acrylonitrile) is 70/30 to 80/20 are preferable.

Such ABS resins are commercially available, with preferred examples including STYLAC (Asahi Kasei Corporation) and Saikolac (Ube Saikon Co., Ltd.).

Further, there may be used super engineering plastics and syndiotactic polystyrenes having the above melting point Tm and glass transition temperature Tg, with examples including polyphenylene sulfide, polyamidimide, polyethersulfone and polyether ether ketone.

The resins (A) used in the invention are any of the resins (1) to (5) and have a melting point Tm in the aforementioned range. The resins are preferably any of the resins (1) to (5) and have a melting point Tm and a glass transition temperature Tg in the aforementioned ranges. Specific examples of the resins (A), in detail specific examples of the polycarbonates include general polycarbonate resins and alloys such as PC/ABS; specific examples of the polyamide resins include general polyamide resins such as nylon 6, nylon 66 and nylon 46 and modified polyamide resins such as semi-aromatic or aromatic polyamides; and specific examples of the polyimide resins include general polyimide resins. In a more preferred embodiment, the resin (A) is selected from the polyamides and the polycarbonates.

<Olefin Polymer Wax Components (B)>

Examples of the olefin polymer wax components (B) used in the invention include cyclic olefin polymer waxes (B-1), cyclic olefin polymer waxes (B-1') and non-cyclic olefin polymer waxes (B-2). In the present specification, the olefin polymer waxes refer to olefin polymers usable in wax applications. In the specification, the cyclic olefin polymer waxes refer to olefin polymer waxes having a cyclic structure, and the non-cyclic olefin polymer waxes refer to olefin polymer waxes having no cyclic structure.

[Cyclic Olefin Polymer Waxes (B-1)]

The cyclic olefin polymer waxes (B-1) have the following structural units (a) and (b):

(a) units derived from ethylene (b) units derived from a cyclic olefin.

The structural units (b) may be units (b') derived from a cyclic polyene.

The olefin polymer wax (B-1) is a copolymer obtained by copolymerizing ethylene and at least one cyclic olefin having a cyclic structure. When a cyclic polyene described later is used as the cyclic olefin, the structural units (b) obtained are the structural units (b').

Preferred cyclic olefins are cyclic olefins having at least one unsaturated group in the molecule. Specific examples of the cyclic olefins having one unsaturated group in the molecule include C3-C20, and preferably C5-C15 cyclic olefins such as cyclopentene, cycloheptene, norbornene, 5-methyl-2-norbornene, tetracyclododecene and vinylcyclohexane.

Specific examples of the cyclic olefins having at least two unsaturated groups in the molecule (i.e., the cyclic polyenes) include C5-C20, and preferably C5-C10 cyclic olefins such as dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene and 2-propenyl-2,2-norbornadiene.

Of these, non-conjugated polyenes such as methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene and 2-propenyl-2,2-norbornadiene are preferable, and 5-vinylnorbornene is particularly preferable.

In the invention, the cyclic olefins include aromatic vinyl compounds. Examples of the aromatic vinyl compounds include styrene and mono- or polyalkylstyrenes such as α-methylstyrene, o-methylstyrene, m-methylstyrene, p-methylstyrene, o,p-dimethylstyrene, o-ethylstyrene, m-ethylstyrene and p-ethylstyrene.

The cyclic olefins may be used singly, or two or more kinds may be used in combination.

The cyclic olefin polymer wax (B-1) contains the structural units (b) at 0.05 to 50 mol %, preferably 0.1 to 20 mol %, more preferably 0.2 to 10 mol %, and particularly preferably 0.5 to 5 mol % based on all the structural units in the polymer. The remaining proportion is preferably accounted for by the structural units (a). That is, the structural units (a) are desirably present at 99.95 to 50 mol %, preferably 99.9 to 80 mol %, more preferably 99.8 to 90 mol %, and particularly preferably 99.5 to 95 mol %. When the cyclic olefin polymer wax (B-1) contains the structural units from the cyclic olefin having a cyclic structure at the above proportion, the polymerization activity is appropriately high and the heat-resistant cyclic olefin polymer wax has excellent balance between heat resistance and mold-releasing properties. In the invention, the contents of the structural units may be determined by a method described in Examples later.

The cyclic olefin polymer wax (B-1) may further have the following structural units (c):

(c) units derived from a linear or branched C3-C20 olefin.

In this case, the olefin polymer wax (B-1) is a copolymer obtained by copolymerizing ethylene, at least one cyclic olefin having a cyclic structure, and a linear or branched C3-C20 olefin.

Specific examples of the linear or branched C3-C20 olefins include C3-C20, preferably C3-C10 linear α-olefins such as propylene, 1-butene, 1-pentene, 1-hexene, 1-octene, 1-decene, 1-dodecene, 1-tetradecene, 1-hexadecene, 1-octadecene and 1-eicosene; and preferably C5-C20, more preferably C5-C10 branched α-olefins such as 3-methyl-1-butene, 3-methyl-1-pentene, 3-ethyl-1-pentene, 4,4-dimethyl-1-pentene, 4-methyl-1-hexene, 4,4-dimethyl-1-hexene, 4-ethyl-1-hexene and 3-ethyl-1-hexene.

The linear or branched C3-C20 olefins may be used singly, or two or more kinds may be used in combination.

The cyclic olefin polymer wax (B-1) may contain the structural units (c) at 0.01 to 15 mol %, preferably 0.05 to 8 mol %, and particularly preferably 0.1 to 5 mol % based on all the structural units in the polymer. When the cyclic olefin polymer wax (B-1) contains the structural units (c), it is preferable that the remaining proportion after the deduction of the amounts of the structural units (b) and (c) is the amount of the structural units (a). That is, it is preferable that the structural units (a) are present at 99.94 to 35 mol %, preferably 99.85 to 72 mol %, more preferably 99.7 to 85 mol %, and particularly preferably 99.4 to 90 mol %. When the cyclic olefin polymer wax contains the structural units from the C3-C20 olefin at the above proportion, the heat-resistant cyclic olefin polymer wax has excellent balance between heat resistance and mold-releasing properties.

The cyclic olefin polymer wax (B-1) may further have the following structural units (d):

(d) units derived from other C3-C20 olefins (except the cyclic olefins).

In this case, the olefin polymer wax (B-1) is a copolymer obtained by copolymerizing the aforementioned monomers and other olefin(s).

Such additional olefins include conjugated dienes, non-conjugated polyenes and functionalized vinyl compounds.

The conjugated dienes include C4-C20, preferably C4-C10 compounds such as 1,3-butadiene, isoprene, chloroprene, 1,3-pentadiene, 2,3-dimethylbutadiene, 4-methyl-1,3-pentadiene, 1,3-pentadiene, 1,3-hexadiene and 1,3-octadiene.

The non-conjugated polyenes include C5-C20, preferably C5-C10 compounds such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene and 4,8-dimethyl-1,4,8-decatriene (DMDT).

The functionalized vinyl compounds include hydroxyl group-containing olefins, halogenated olefins, unsaturated carboxylic acids such as acrylic acid, propionic acid, 3-butenoic acid, 4-pentenoic acid, 5-hexenoic acid, 6-heptenoic acid, 7-octenoic acid, 8-nonenoic acid and 9-decenoic acid, unsaturated amines such as allylamine, 5-hexene amine and 6-heptene amine, unsaturated acid anhydrides such as (2,7-octadienyl)succinic acid anhydride, pentapropenylsuccinic acid anhydride and compounds corresponding to the above unsaturated carboxylic acids except that the carboxylic acid groups are replaced by carboxylic acid anhydride groups, unsaturated carboxylic acid halides such as compounds corresponding to the above unsaturated carboxylic acids except that the carboxylic acid groups are replaced by carboxylic acid halide groups, and unsaturated epoxy compounds such as 4-epoxy-1-butene, 5-epoxy-1-pentene, 6-epoxy-1-hexene, 7-epoxy-1-heptene, 8-epoxy-1-octene, 9-epoxy-1-nonene, 10-epoxy-1-decene and 11-epoxy-1-undecene.

The hydroxyl group-containing olefins are not particularly limited as long as they are olefin compounds having a hydroxyl group, with examples including hydroxyl-terminated olefin compounds. Specific examples of the hydroxyl-terminated olefin compounds include C2-C20, preferably C2-C10 linear hydroxylated α-olefins such as vinyl alcohol, allyl alcohol, hydroxylated-1-butene, hydroxylated-1-pentene, hydroxylated-1-hexene, hydroxylated-1-octene, hydroxylated-1-decene, hydroxylated-1-dodecene, hydroxylated-1-tetradecene, hydroxylated-1-hexadecene, hydroxylated-1-octadecene and hydroxylated-1-eicosene; and preferably C5-C20, more preferably C5-C10 branched hydroxylated α-olefins such as hydroxylated-3-methyl-1-butene, hydroxylated-4-methyl-1-pentene, hydroxylated-3-methyl-1-pentene, hydroxylated-3-ethyl-1-pentene, hydroxylated-4,4-dimethyl-1-pentene, hydroxylated-4-methyl-1-hexene, hydroxylated-4,4-dimethyl-1-hexene, hydroxylated-4-ethyl-1-hexene and hydroxylated-3-ethyl-1-hexene.

The halogenated olefins are halogenated α-olefins having a Group 17 atom in the periodic table such as chlorine, bromine or iodine. Examples thereof include C2-C20, preferably C2-C10 linear halogenated α-olefins such as halogenated vinyl, halogenated-1-butene, halogenated-1-pentene, halogenated-1-hexene, halogenated-1-octene, halogenated-1-decene, halogenated-1-dodecene, halogenated-1-tetradecene, halogenated-1-hexadecene, halogenated-1-octadecene and halogenated-1-eicosene; and preferably C5-C20, more preferably C5-C10 branched halogenated α-olefins such as halogenated-3-methyl-1-butene, halogenated-4-methyl-1-pentene, halogenated-3-methyl-1-pentene, halogenated-3-ethyl-1-pentene, halogenated-4,4-dimethyl-1-pentene, halogenated-4-methyl-1-hexene, halogenated-4,4-dimethyl-1-hexene, halogenated-4-ethyl-1-hexene and halogenated-3-ethyl-1-hexene.

The additional olefins may be used singly, or two or more kinds may be used in combination.

In a preferred embodiment, the cyclic olefin polymer wax (B-1) contains the structural units (d) at 0.01 to 5 mol based on 100 mol of the structural units (a), (b) and (c) combined.

The olefin polymer wax component (B) may be obtained by directly polymerizing the aforesaid monomers including the cyclic olefin or may be obtained by thermal decomposition of a high-molecular weight olefin polymer. The olefin polymer waxes described above or the high-molecular weight olefin polymers may be produced by any processes without limitation. For example, monomers including ethylene, α-olefin and cyclic olefin may be polymerized in the presence of a Ziegler/Natta catalyst or a metallocene catalyst. Of the catalysts, metallocene catalysts are preferred. A suitable metallocene catalyst is a catalyst which contains a Group 4 transition metal metallocene compound and an organoaluminum oxy compound and/or an ionizing ionic compound (JP-A-2005-171146).

In a preferred embodiment, the cyclic olefin polymer wax (B-1) satisfies (Bi) to (By) below.

(Bi) The content of the units derived from a cyclic olefin is 0.1 to 4.0 units per molecule of the polymer. The cyclic olefin polymer wax (B-1) more preferably contains the units derived from a cyclic olefin at 0.5 to 3.0 units/molecule, and still more preferably 1.0 to 2.0 units/molecule. When the cyclic olefin polymer wax (B-1) has this content of the cyclic olefin-derived units, the random breakage of molecular chains by heating at a shaping temperature is assumed to take place in a manner such that relatively weak C—C bonds (C—C bonds in the ring structures) break preferentially and the breakage of the polyolefin main chains is avoided. As a result, it is assumed that the length of the molecular chains is more likely to be maintained and drastic reduction in molecular weight is suppressed. Further, local C—C bond breakage in the ring structure is presumed to give heat absorption, and therefore the cyclic olefin polymer wax (B-1) having such a ring structure achieves excellent heat resistance compared to conventional olefin polymer waxes having an identical molecular weight.

The content of the cyclic olefin-derived units in the cyclic olefin polymer wax may be determined as described below.

The wax is analyzed by $^{13}$C-NMR, and the area of the peaks assigned to the carbon atoms in the ring structure and the area of the peaks of all the carbon atoms are compared with each other to determine the number of ring structures per 1000 carbon atoms. The content of the ring structures per molecule may be calculated from the formula: number average molecular weight Mn×number of ring structures/14,000. In the invention, the number of the ring structures per 1000 carbon atoms is preferably 0.3 to 140, more preferably 0.3 to 122, and still more preferably 2.8 to 105.

The content of the units derived from a cyclic olefin may be controlled to the above range by adjusting the amount of the monomer giving the structural units (b) in the polymerization or by selecting the catalyst or the polymerization temperature. For example, when polyethylene waxes are produced using a metallocene catalyst described later in synthetic examples, the number of the ring structures per 1000 carbon atoms may be increased by introducing a larger number of the structural units (b). While the polymerization temperature is usually in the range of 100 to 200° C., the polymerization temperature is preferably in the range of 100 to 180° C., and more preferably 100 to 170° C. in order to produce a polyethylene wax having the above preferred content of the cyclic olefin-derived units.

(Bii) The density is in the range of 870 to 980 kg/m$^3$ as determined by a density gradient tube method. In more detail, the cyclic olefin polymer wax (B-1) desirably has a density of not less than 870 kg/m$^3$, preferably not less than 880 kg/m$^3$, more preferably not less than 900 kg/m$^3$, and not more than 980 kg/m$^3$, preferably not more than 970 kg/m$^3$, more preferably not more than 950 kg/m$^3$, particularly preferably not more than 920 kg/m$^3$. The cyclic olefin polymer wax (B-1) having a density in the above range achieves excellent balance between heat resistance and mold-releasing properties.

The density may be controlled to the above range as described below. The density tends to be lowered by controlling the amounts of the structural units (b), (c) and (d) in the wax and, in general, by increasing the contents of these comonomers. Alternatively, the density may be controlled by selecting the catalyst or the polymerization temperature. For example, while the polymerization temperature usually ranges from 100 to 200° C. when polyethylene waxes are produced using a metallocene catalyst described later in synthetic examples, the polymerization temperature is preferably in the range of 100 to 180° C., and more preferably 100 to 170° C. in order to produce a polyethylene wax having the above preferred density.

(Biii) The melting point determined by differential scanning calorimetry (DSC) is in the range of 70 to 130° C. In detail, the cyclic olefin polymer wax (B-1) desirably has a melting point of not less than 70° C., preferably not less than 80° C., more preferably not less than 90° C., particularly preferably not less than 100° C., and not more than 140° C., preferably not more than 130° C., more preferably not more than 120° C., particularly preferably not more than 110° C. When the cyclic olefin polymer wax (B-1) has a melting point in the above range, the cyclic olefin polymer wax achieves excellent heat resistance and mold-releasing properties.

The melting point may be controlled to the above range as described below. The melting point tends to be lowered by controlling the amounts of the structural units (b), (c) and (d) in the wax and increasing the contents of these comonomers. Alternatively, the melting point may be controlled by selecting the catalyst or the polymerization temperature. For example, while the polymerization temperature usually ranges from 100 to 200° C. when polyethylene waxes are produced using a metallocene catalyst described later in synthetic examples, the polymerization temperature is preferably in the range of 100 to 180° C., and more preferably 100 to 170° C. in order to produce a polyethylene wax having the above preferred melting point.

(Biv) The number average molecular weight according to gel permeation chromatography (GPC) is in the range of 400 to 5,000. The number average molecular weight (Mn) of the cyclic olefin polymer wax (B-1) is preferably in the range of 800 to 5,000, more preferably 1,000 to 3,000, and particularly preferably 1,500 to 2,500. When the cyclic olefin polymer wax (B-1) has Mn in the above range, the olefin polymer wax achieves excellent balance between heat resistance and mold-releasing properties.

The number average molecular weight Mn may be controlled to the above range as described below. The number average molecular weight Mn tends to be lowered by increasing the amount of hydrogen introduced in the wax. Alternatively, the number average molecular weight may be controlled by selecting the catalyst or the polymerization temperature. For example, while the polymerization temperature usually ranges from 100 to 200° C. when polyethylene waxes are produced using a metallocene catalyst described later in synthetic examples, the polymerization temperature is preferably in the range of 100 to 180° C., and more preferably 100 to 170° C. in order to produce a polyethylene wax having the above preferred number average molecular weight Mn.

(Bv) The ratio of the weight average molecular weight (Mw) to the number average molecular weight (Mn), (Mw/Mn), according to GPC is not more than 4.0. In the cyclic olefin polymer wax (B-1), the ratio of the weight average molecular weight to the number average molecular weight (Mw/Mn) is preferably not more than 3.5, and more preferably not more than 3.0. The weight average molecular weight (Mw) and the number average molecular weight (Mn) may be determined by gel permeation chromatography (GPC) in terms of polyethylene. GPC conditions are temperature: 140° C. and solvent: o-dichlorobenzene.

The ratio Mw/Mn may be controlled to the above range by selecting the catalyst or the polymerization temperature. While Ziegler/Natta catalysts or metallocene catalysts are generally used in the synthesis of polyethylene waxes, metallocene catalysts are preferably used to obtain the above preferred Mw/Mn. Further, while the polymerization temperature usually ranges from 100 to 200° C. when polyethylene waxes are produced using a metallocene catalyst described later in synthetic examples, the polymerization temperature is preferably in the range of 100 to 180° C., and more preferably 100 to 170° C. in order to produce a polyethylene wax having the above preferred Mw/Mn.

In a more preferred embodiment, the cyclic olefin polymer wax (B-1) further satisfies (Bvi) below.

(Bvi) The 10% weight loss temperature T according to TGA is not less than 350° C., or the 10% weight loss temperature T according to TGA and the weight average molecular weight Mw satisfy Formula (I) below:

$$T \geq 0.002 \times Mw + B \tag{I}$$

(wherein the value B (° C.) is 320).
The 10% weight loss temperature T according to TGA is not less than 350° C., and particularly preferably not less than 400° C. The 10% weight loss temperature is a temperature which causes a 10% weight loss when 10 mg of the cyclic structure-containing olefin polymer wax is analyzed with a thermogravimetric analyzer (TG-DTA 320 manufactured by SII). The weight loss temperature is a general evaluation index for resins. Herein, the 10% weight loss temperature is adopted as a simple index for evaluating the practical utility of shaped resin articles. The 10% weight loss temperature T is a good practicality evaluation index with high versatility and clearly differentiates the thermal weight loss of waxes. The TGA measurement may be performed in an air atmosphere of 200 mL/min and at a temperature increasing rate of 20° C./min and a temperature range of 30° C. to 700° C.

In another preferred embodiment, the olefin polymer wax has a relation represented by Formula (I) below between the 10% weight loss temperature T in air and the weight average molecular weight Mw. In Formula (I), the value B (° C.) is 320, preferably 330, and more preferably 340.

$$T \geq 0.002 \times Mw + B \tag{I}$$

(In Formula (I), T is the 10% weight loss temperature according to thermogravimetry in an air atmosphere, and Mw is the weight average molecular weight Mw determined by gel permeation chromatography (GPC)).

The olefin polymer wax satisfying the above requirement achieves excellent heat resistance while maintaining the capability of improving mold-releasing properties and flowability. The excellent heat resistance makes it unlikely that the wax is decomposed to generate gas even when used in the shaping of resins such as engineering plastics at high temperatures or that the wax is deposited as mold deposits on an injection mold. The cyclic olefin polymer waxes (B-1) have excellent heat resistance and show smaller thermal weight loss than conventional olefin polymer waxes such as polyethylene waxes.

Formula (I) has been obtained from studies based on experimental simulations. It is known that the thermal weight loss behavior of general polyethylene waxes is dependent on the molecular weight. In detail, a polyethylene wax is thermally decomposed such that C—C bonds are randomly cleaved by thermal energy and consequently the molecular weight is gradually reduced. When the molecules are fragmented to sufficiently small sizes, the fragments will be volatilized. It is accordingly presumed that a polyethylene wax having a higher molecular weight will require more thermal energy and more time until it is cleaved into sufficiently small fragments. In the course of deriving Formula (I), the present inventors have found that the experimental results of general commercially available polyethylene waxes indicate a correlation between a temperature T causing a certain thermal weight loss and the molecular weight. In detail, the present inventors have found that general commercially available polyethylene waxes have a relation represented by Formula (I') below.

$$T = 0.002 \times Mw + B \tag{I'}$$

On the other hand, the present inventors have found that the cyclic olefin polymer waxes (B-1) used in the present invention have the relation of Formula (I). It is considered that the cyclic olefin polymer waxes (B-1) satisfying Formula (I) (in which T is a high value which does not meet Formula (I')) have a small reduction in molecular weight by random C—C bond cleavages.

The temperature satisfying the requirement (Bvi) may be achieved as follows. The temperature T tends to be increased by increasing the amount of the structural units (b) in the wax. Alternatively, the temperature may be controlled by selecting the catalyst or the polymerization temperature. For example, while the polymerization temperature usually ranges from 100 to 200° C. when polyethylene waxes are produced using a metallocene catalyst described later in synthetic examples, the polymerization temperature is preferably in the range of 100 to 180° C., and more preferably 100 to 170° C. in order to produce a polyethylene wax having the above preferred temperature T.

In a preferred embodiment, the cyclic olefin polymer wax (B-1) further satisfies (Bvii) below.

(Bvii) The penetration hardness is not more than 15 dmm, preferably not more than 10 dmm, more preferably not more than 3 dmm, and particularly preferably not more than 1 dmm.

The penetration hardness may be determined in accordance with JIS K2207.

When the cyclic olefin polymer wax (B-1) has the above penetration hardness, the heat-resistant olefin polymer wax achieves excellent handling properties.

The penetration hardness may be controlled to the above range as described below. The penetration hardness tends to be increased by increasing the amounts of the structural units (b) to (d) in the wax. Alternatively, the penetration hardness may be controlled by selecting the catalyst or the polymerization temperature. For example, while the polymerization temperature usually ranges from 100 to 200° C. when polyethylene waxes are produced using a metallocene catalyst described later in synthetic examples, the polymerization temperature is preferably in the range of 100 to 180° C., and more preferably 100 to 170° C. in order to produce a polyethylene wax having the above preferred penetration hardness.

[Cyclic Olefin Polymer Waxes (B-1')]

The cyclic olefin polymer wax (B-1') is obtained by modifying the cyclic olefin polymer wax (B-1). In detail, the cyclic olefin polymer wax (B-1') contains the following structural units (a) and (b").

(a) units derived from ethylene (b") units which are derived from a cyclic olefin and in which an unsaturated group has been modified.

The cyclic olefin polymer wax (B-1') is generally obtained by modifying an olefin polymer wax (B-1) which is a copolymer of ethylene and a cyclic olefin having at least two unsaturated groups in the molecule. In detail, the cyclic olefin polymer wax (B-1') is a modification product of the olefin polymer wax (B-1) in which unsaturated groups in the structural units (b) (in detail, the structural units (b')) have been modified to give structural units (b").

The structural units (b") are preferably units (b''') which are derived from a cyclic polyene and in which an unsaturated group has been acid-modified. The reason for this preference is as follows. When structural units in a wax are randomly modified or grafted to molecules, the obtainable main chain may have a structure in which the main chain bonds are easily cleaved. In contrast, the above modification at the specific sites provides a structure maintaining the main chain skeleton and having higher heat resistance. Such cyclic olefin polymer waxes (B-1') may be produced by acid-modification of olefin polymer waxes (B-1) which are copolymers of ethylene and a cyclic olefin having at least two unsaturated groups in the molecule.

The structural units (b') may be present in every molecules of the modified cyclic olefin polymer wax (B-1') or in some of the molecules. Further, the structural units (b) in each polymer molecule may be completely or partially modified to the structural units (b').

The cyclic olefin polymer wax (B-1') contains the structural units (b") at 0.05 to 50 mol %, preferably 0.1 to 20 mol %, more preferably 0.2 to 10 mol %, and particularly preferably 0.5 to 5 mol % based on all the structural units in the polymer. The remaining proportion is preferably accounted for by the structural units (a). That is, it is preferable that the structural units (a) are present at 99.95 to 50 mol %, preferably 99.9 to 80 mol %, more preferably 99.8 to 90 mol %, and particularly preferably 99.5 to 95 mol %. When the cyclic olefin polymer wax (B-1') contains the structural units from a cyclic olefin at the above proportion, the polymerization activity is appropriately high and the heat-resistant cyclic olefin polymer wax has excellent balance between heat resistance and mold-releasing properties.

Because the structural units (b") result from modification of unsaturated groups in the structural units (b) of the olefin polymer wax (B-1), a preferred content of the structural units (b") is similar to that of the structural units (b). When the cyclic olefin polymer wax (B-1) contains the structural units (c) and (d), these structural units are not affected by the modification and therefore the contents thereof in the cyclic olefin polymer wax (B-1') are not changed.

Examples of the modifiers for modifying the unsaturated groups include oxidizers, sulfonating agents, maleic acid anhydride and derivatives thereof, hydroborating agents, organoaluminum-containing compounds and halogenating agents. The unsaturated groups may be modified by at least one of these compounds into heteroatom-containing groups such as oxygen-containing groups, sulfur-containing groups, silicon-containing groups, boron-containing groups or halogen-containing groups.

The sulfonating agents include sulfuric acid-acetic anhydride. The hydroborating agents include diborane, trimethylborane and 9-boranebicyclo[3.3.1]nonane. The organoaluminum hydrides include diisobutylaluminum hydride. The silylating agents include triethoxysilyl hydride/$H_2PtCl_2$ and trimethoxysilyl hydride/$H_2PtCl_2$. The halogenating agents include hydrogen bromide, hydrogen chloride and hydrogen iodide.

Of these, maleic acid anhydride and derivatives thereof are suitably used for the production of the structural units (b''').

The modification with these modifiers may be performed under conditions (such as temperature, time, catalyst and catalyst amount) as described in Die Makromolecular Chemie Makromolecular Symposia 48/49, 317-332, 1991.

The cyclic olefin polymer wax (B-1') preferably satisfies (Bi') below.

(Bi') The content of the units derived from a cyclic olefin is 0.1 to 4.0 units per molecule of the polymer. The cyclic olefin polymer wax (B-1') more preferably contains the units derived from a cyclic olefin at 0.5 to 3.0 units/molecule, and still more preferably 1.0 to 2.0 units/molecule.

The satisfaction of the above requirement is preferable for the reasons as described hereinabove. The content may be determined and controlled by the same methods as described for the cyclic olefin polymer waxes (B-1).

In a more preferred embodiment, the cyclic olefin polymer wax (B-1') further satisfies (Bvi') below.

(Bvi') The 10% weight loss temperature T according to TGA is not less than 350° C., or the 10% weight loss temperature T according to TGA and the weight average molecular weight Mw satisfy Formula (I) below:

$$T \geq 0.002 \times Mw + B \qquad (I)$$

(wherein the value B (° C.) is 320).

The satisfaction of the above requirement is preferable for the reasons as described hereinabove. The 10% weight loss temperature T according to TGA may be determined and controlled to satisfy the above requirement by the same methods as described for the cyclic olefin polymer waxes (B-1).

The cyclic olefin polymer wax (B-1') that has been functionalized by the modification may be subjected to metal salt-forming reaction to give a metal salt wax. In the specification, the metal salt wax refers to the olefin polymer usable in wax applications in which a monovalent or divalent metal is coordinated. For example, a polyethylene wax in which an unsaturated group has been modified with acid may be formed into a metal salt wax by a process in which an alkali metal salt or an alkaline earth metal salt in an amount two times the equivalent amount of the reactive functional groups is dissolved in water to a solid concentration of 40 to 50%, and the polymer and the solution are reacted at 140° C. and 0.3 MPa for 2 hours.

The metal in the metal salt wax is preferably at least one selected from K, Na, Ca and Zn. When the metal is K, Na or Ca, the modification is easy.

[Non-cyclic Olefin Polymer Waxes (B-2)]

The non-cyclic olefin polymer waxes (B-2) are copolymers obtained by polymerizing monomers having no cyclic structure.

Examples of the monomers having no cyclic structure include α-olefins having no alicyclic ring or aromatic ring, modified products thereof, long-chain fatty acids and modified products thereof.

The monomers having no cyclic structure may be used singly, or two or more kinds may be used in combination.

The non-cyclic olefin polymer waxes (B-2) may be modified, for example functionalized. Examples of the modified non-cyclic olefin polymer waxes (B-2) include acid-modified products of ethylene/(meth)acrylic acid copolymers and ethylene/propylene copolymers.

The modified non-cyclic olefin polymer waxes (B-2) may be obtained by modifying non-cyclic olefin polymers usable in wax applications.

In detail, unsaturated groups may be modified with similar modifiers by similar methods as described for the cyclic olefin polymer waxes (B-1').

The non-cyclic olefin polymer waxes (B-2) desirably have a number average molecular weight in the range of 500 to 5,000, preferably 600 to 4,000, and more preferably 1,000 to 3,000. This number average molecular weight ensures that smoking is suppressed during the shaping and excellent mold-releasing properties are obtained. If the number average molecular weight is excessively high, mold-releasing properties may be reduced. The number average molecular weight may be determined as described for the cyclic olefin polymer waxes (B-1).

The non-cyclic olefin polymer wax (B-2) that has been functionalized by the modification may be subjected to metal salt-forming reaction to give a metal salt wax. When the non-cyclic olefin polymer wax (B-2) is a metal salt wax, in more detail a metal salt wax from the acid-modified ethylene/(meth)acrylic acid copolymer or ethylene/propylene copolymer, the wettability with fillers such as inorganic reinforcing materials (E) described later and the thermoplastic resins (A) is enhanced and the obtainable shaped articles have a smooth surface and good appearance. When a metal salt wax from the acid-modified ethylene/(meth)acrylic acid copolymer or ethylene/propylene copolymer is used in combination with the cyclic olefin polymer wax (B-1) or (B-1'), enhanced mold-releasing properties are achieved in addition to the surface smoothness and good appearance.

The metal in the metal salt wax is preferably at least one selected from K, Na, Ca and Zn. When the metal is K, Na, Ca or Zn, the modification is easy.

In an embodiment of the resin composition (X), at least one olefin polymer wax of the olefin polymer wax component (B) may be a metal salt wax. That is, of the olefin polymer wax component (B) in the resin composition (X), the cyclic olefin polymer wax (B-1) may be a metal salt wax, the non-cyclic olefin polymer wax (B-2) may be a metal salt wax, or they may be both metal salt waxes.

The use of the metal salt waxes allows for further improvements in mold-releasing properties when the heat resistant resin is shaped. When the cyclic olefin polymer wax (B-1) is a metal salt wax, the dispersibility into the resin may be improved while maintaining the heat resistance or the heat resistance may be further increased. On the other hand, the use of the metal salt waxes is preferably avoided for the production of metal-free shaped articles (in particular, electronic materials). The use of the metal salt waxes is therefore appropriately selected depending on the use of the resin compositions.

In the resin composition (X), the cyclic olefin polymer wax (B-1) may be used singly or in combination with the cyclic olefin polymer wax (B-1') and/or the non-cyclic olefin polymer wax (B-2) as required. In another embodiment, the cyclic olefin polymer wax (B-1') may be used singly, or it may be used together with the non-cyclic olefin polymer wax (B-2) as required. Of these embodiments, it is particularly preferable to use the cyclic olefin polymer wax (B-1) and/or the cyclic olefin polymer wax (B-1') in order that the color hue or the appearance of shaped articles is not deteriorated. The cyclic olefin polymer waxes (B-1), the cyclic olefin polymer waxes (B-1') and the non-cyclic olefin polymer waxes (B-2) may be each used singly, or two or more kinds may be used in combination.

<Inorganic Reinforcing Materials (E)>

In the invention, at least one inorganic reinforcing material (E) may be used which is selected from glass fibers, carbon fibers and fillers. The inorganic reinforcing materials (E) may be used singly, or two or more kinds may be used in combination.

The glass fibers are not particularly limited, and examples thereof include roving glass, chopped strand glass and milled glass. They may be used singly, or two or more kinds may be used in combination.

The length of the glass fibers is not particularly limited. The glass fibers are sometimes broken when mixed with the resin in an extruder or the like. Accordingly, from the viewpoint of workability, the length is preferably in the range of 0.3 mm to 10 mm, and more preferably 2 mm to 7 mm. In an embodiment, the glass fibers in the composition of the invention have lengths in the range of 2 mm to 5 mm. The thickness of the glass fibers is not particularly limited, but the average fiber diameter is 1 to 25 μm, and preferably 5 to 17 μm. The aspect ratio (average fiber length/fiber diameter) is preferably not more than 25. Glass fibers having different aspect ratios may be mixed in an appropriate ratio. The cross sectional shape of the glass fibers is not particularly limited, and may be a circular shape, an eyebrow shape, a calabash shape, an elliptical shape or a cylindrical shape.

The glass fibers may be surface-treated with agents such as silane-coupling agents, titanate-coupling agents and aluminate-coupling agents. The silane-coupling agents used herein include vinyltrichlorosilane, vinyltriethoxysilane, vinyltrimethoxysilane, γ-methacryloxypropyltrimethoxysilane, β-(3,4-epoxycyclohexyl)ethyltrimethoxysilane, γ-glycidoxypropyltrimethoxysilane, N-β-(aminoethyl) γ-aminopropyltrimethoxysilane, γ-aminopropyltriethoxysilane, N-phenyl-γ-aminopropyltrimethoxysilane, γ-mercaptopropyltrimethoxysilane and γ-chloropropyltrimethoxysilane.

In another embodiment, the glass fibers may be entangled with resins such as olefin resins, styrene resins, acrylic resins, polyester resins, epoxy resins and urethane resins. In this embodiment, the resins such as olefin resins or urethane resins are used in the entanglement treatment without affecting the properties of the composition.

In still another embodiment, the glass fibers may be coated with metals such as nickel, copper, cobalt, silver, aluminum and iron or alloys thereof by a plating method or a deposition method.

The shapes and types of the carbon fibers are not particularly limited. Exemplary shapes include chopped strands, roving strands and milled fibers. The types of the carbon fibers include pitch fibers and polyacrylonitrile fibers.

The carbon fibers may be obtained by spinning or shaping a composition of materials followed by carbonization. Alternatively, the carbon fibers may be manufactured by a process which does not basically involve spinning, for example by a vapor-phase growth process.

Vapor-phase grown carbon fibers have small fiber diameters and a large L/D ratio. Accordingly, the use of such carbon fibers provides high rigidity and good appearance of the obtainable shaped articles.

Furthermore, carbon fibers that have been activated to have an increased specific surface area may be used in the invention.

In a preferred embodiment, the carbon fibers may be surface-treated with agents such as silane-coupling agents, titanate-coupling agents and aluminate-coupling agents.

The carbon fibers may be entangled with resins such as epoxy resins, urethane resins, olefin resins, styrene resins, polyester resins and nylon resins, with epoxy resins and urethane resins being preferable.

In general, fibers with a diameter in the range of 6 to 18 μm are used. In the present invention, fibers having a diameter of 0.5 to 15 μm are preferable, and fibers having a diameter of 1 to 10 μm are particularly preferable.

The chopped strands used in the invention preferably have a cut length of 1 to 15 mm, more preferably 2 to 10 mm, and most preferably 3 to 8 mm. The chopped strands are broken during the shaping.

The carbon fibers in the resin composition preferably have an aspect ratio (L/D) in the range of 15 to 100, and more preferably 20 to 50 wherein L is the length of the fibers in the axis direction and D is the fiber diameter.

The fillers include amorphous fillers such as calcium carbonate, silica, kaolin, clay, titanium oxide, barium sulfate, zinc oxide, aluminum hydroxide, alumina and magnesium hydroxide; platy fillers such as talc, mica and glass flakes; acicular fillers such as wollastonite, potassium titanate, basic magnesium sulfate, sepiolite, xonotlite and aluminum borate; and conductive fillers such as metal powders, metal flakes and carbon blacks. Glass beads and glass powders may also be used. The fillers may be used singly, or a plurality thereof may be used in combination. The fillers may be coated with carbon or may be surface-treated with agents such as silane-coupling agents, and such fillers may be used singly or in combination with one another.

In the invention, the inorganic reinforcing materials are not compulsory. When they are used, the glass fibers, the carbon fibers or the fillers are preferable.

<Other Components (F)>

The olefin polymer wax-containing resin compositions according to the present invention may contain additives while still achieving the objects and advantageous effects of the invention. Exemplary additives are flame-retardants such as brominated bisphenols, brominated epoxy resins, brominated polystyrenes, brominated polycarbonates, triphenyl phosphates, phosphonic acid amides and red phosphorus; flame-retardant auxiliaries such as antimony trioxide and sodium antimonate; heat stabilizers such as phosphates and phosphites; antioxidants such as hindered phenols; heat resistant agents, weathering stabilizers, light stabilizers, releasing agents, fluidity modifiers, colorants, pigments, lubricants, antistatic agents, crystal nucleating agents, plasticizers, foaming agents, halogen catchers and anti-drip agents.

Further, lubricants that are conventionally used in thermoplastic resins requiring high-temperature shaping may be used, with examples including low-molecular weight fatty acid esters or fatty acid metal salts (such as montanic acid esters and calcium montanate).

<Resin Compositions (X)>

The resin compositions (X) according to the invention may be obtained by blending 100 parts by weight of the resin (A) with the olefin polymer wax component (B) at 0.01 to 10 parts by weight, preferably 0.05 to 7 parts by weight, and more preferably 0.1 to 5 parts by weight. Using the olefin polymer wax component (B) in the above amount is preferable in terms of mold-releasing properties in the shaping, smoking inhibition, strand stability and mechanical properties of the obtainable shaped articles. If the amount exceeds the above range, the shaping may be difficult. When two or more kinds of the cyclic olefin polymer waxes (B-1), the cyclic olefin polymer waxes (B-1') and the non-cyclic olefin polymer waxes (B-2) are used as the olefin polymer wax component (B), the above amount indicates the total amount of these waxes. When the cyclic olefin polymer wax (B-1) and the cyclic olefin polymer wax (B-1') are used as the olefin polymer wax component (B), the total amount of the cyclic olefin polymer wax (B-1) and the cyclic olefin polymer wax (B-1') is particularly preferably in the range of 0.1 to 3 parts by weight based on 100 parts by weight of the resin (A) from the viewpoints of color hue and appearance of the shaped articles.

When the cyclic olefin polymer wax (B-1) and the cyclic olefin polymer wax (B-1') are used as the olefin polymer wax component (B), the ratio of the cyclic olefin polymer wax (B-1) and the cyclic olefin polymer wax (B-1') is preferably 10:90 to 99:1 (wt %).

When the cyclic olefin polymer wax (B-1) and the non-cyclic olefin polymer wax (B-2) are used, the ratio of the cyclic olefin polymer wax (B-1) and the non-cyclic olefin polymer wax (B-2) is preferably 10:90 to 99:1 (wt %). In the case where the cyclic olefin polymer wax (B-1') is used instead of the cyclic olefin polymer wax (B-1) in combination with the non-cyclic olefin polymer wax (B-2), the ratio of the cyclic olefin polymer wax (B-1') and the non-cyclic olefin polymer wax (B-2) is preferably 10:90 to 99:1 (wt %).

When the cyclic olefin polymer wax (B-1), the cyclic olefin polymer wax (B-1') and the non-cyclic olefin polymer wax (B-2) are used, the ratio of the cyclic olefin polymer waxes (B-1) and (B-1') combined and the non-cyclic olefin polymer wax (B-2) is preferably 10:90 to 99:1 (wt %). In this case, the ratio of the cyclic olefin polymer wax (B-1) and the cyclic olefin polymer wax (B-1') is preferably 10:90 to 99:1 (wt %).

When the inorganic reinforcing material (E) is used, the inorganic reinforcing material (E) is usually blended at 5 to 250 parts by weight based on 100 parts by weight of the resin (A). Using the inorganic reinforcing material (E) in the above amount is preferable in terms of mold-releasing properties in the shaping, smoking inhibition, strand stability and mechanical properties of the obtainable shaped articles. If the amount of the inorganic reinforcing material (E) is below the above range, the strength of the resin composition may not be increased sufficiently. If the amount of the inorganic reinforcing material (E) is in excess of the above range, the obtainable resin composition may increase brittleness.

When the components (F) are used, each of the components (F) is usually used at 0.01 to 30 parts by weight based on 100 parts by weight of the resin (A). When the components (F) are low-molecular weight fatty acid esters or fatty acid metal salts in order to further improve mold-releasing properties in the shaping, they may be blended in an amount that does not cause smoking during the shaping (generally in an amount of 0.05 to 30 parts by weight based on 100 parts by weight of the resin (A)). From the viewpoint of smoking inhibition during the shaping, however, it is more preferable that such low-molecular weight fatty acid esters or fatty acid metal salts are not used.

The resin compositions (X) of the invention may be manufactured by any processes. For example, the resin (A), the olefin polymer wax component (B) and optionally the inorganic reinforcing material (E) and other components (F) may be mixed together, preferably in amounts such that the contents thereof in the obtainable resin composition will be in the aforementioned ranges, at the same time or in an arbitrary order with use of a tumbling mixer, a twin-cylinder mixer, a Nauta mixer, a Banbury mixer, a kneading roller or a single-screw or twin-screw extruder.

In another embodiment of the resin compositions (X) of the invention, the resin composition (X) may be obtained by blending the resin (A) having a melting point Tm of not less than 200° C. and the olefin polymer wax component (B) and the resin composition (X) contains a metal salt wax from the non-cyclic olefin polymer wax (B-2) as an essential olefin polymer wax component (B). Of the non-cyclic olefin polymer waxes (B-2), metal salt waxes from the acid-modified ethylene/(meth)acrylic acid copolymers or ethylene/propylene copolymers provide good surface smoothness and appearance of the obtainable shaped articles not only when they are used in combination with the cyclic olefin wax (B-1) but also when they are used singly.

<<Shaped Articles>>

Shaped articles of the olefin polymer wax-containing resin compositions according to the invention may be obtained by shaping the aforementioned olefin polymer wax-containing resin compositions by known methods such as extrusion methods, injection molding methods and solution casting methods. The extrusion methods and the injection molding methods are preferable, and the injection molding methods are more preferable.

The shaped articles of the olefin polymer wax-containing resin compositions generally have such shapes as sheets, films, pipes, tubes, special shapes such as window frames and housing members, and laminates. The shaped articles may be used as machinery parts such as electric or electronic components, automobile parts, electric tool housings, camera parts and connectors, and other shaped articles such as relays, switches and connectors.

The olefin polymer wax-containing resin compositions show excellent shaping processability and heat resistance in the extrusion. Further, the compositions have excellent heat resistance, flowability, mold-releasing properties and shot stability in the injection molding.

According to the present invention, the injection molding temperature (the resin temperature) may be decreased compared to the injection molding temperatures where the olefin polymer waxes are not added, in detail temperatures ranging from 200 to 360° C. In more detail, the injection molding temperature may be set at a temperature lower than such usual injection molding temperatures by not less than 5° C., preferably not less than 10° C., and more preferably not less than 15° C. As used herein, the "injection molding temperatures where the olefin polymer waxes are not added" indicate optimum injection molding temperatures that are determined appropriately depending on the resins (A) used and in consideration of the shaping speed or properties of the obtainable shaped articles.

The injection molding conditions other than the injection molding temperature may be conventional. In detail, the injection pressure is usually in the range of 20 to 150 MPa, preferably 25 to 80 MPa, and the mold temperature is usually in the range of 70 to 150° C., preferably 80 to 120° C.

The present invention will be described based on examples hereinbelow without limiting the scope of the invention.

EXAMPLES

Properties of Olefin Polymer Waxes

Properties of olefin polymer waxes were evaluated by the following methods.

(1) Measurement Method for Content of Structural Units Derived from Cyclic Olefin or α-olefin The content of structural units derived from a cyclic olefin or an α-olefin in olefin polymer waxes, and the number M of ring structures per 1,000 carbon atoms were determined by comparing the area of peaks assigned to carbon atoms in unsaturated parts and the area of peaks assigned to all the carbon atoms according to $^{13}$C-NMR or by comparing the area of peaks assigned to carbon atoms in α-olefin parts and the area of peaks assigned to all the carbon atoms according to $^{13}$C-NMR.

(2) Measurement Method for Number of Ring Structures Per Molecule

The content or number of ring structures per molecule was calculated according to the formula Mn×M/14,000 using the number average molecular weight Mn and the number M of ring structures per 1,000 carbon atoms obtained above.

(3) Measurement Method for Density

The density was measured by a density gradient tube method in accordance with JIS K7112.

(4) Measurement Method for Melting Point

The melting point was determined by differential scanning calorimetry (DSC) using DSC-20 (manufactured by Seiko Instruments Inc.). Approximately 10 mg of a sample was heated from −20° C. to 200° C. at a rate of 10° C./min, and the endothermic peak in the curve recorded was obtained as the melting point. Prior to the heating, the resin sample was heated to about 200° C., held at the temperature for 5 minutes, and cooled to room temperature (25° C.) at 20° C./min to erase the thermal history of the resin.

(5) Measurement Method for Mn and Mw

The number average molecular weight Mn and the weight average molecular weight Mw were determined by GPC under the following conditions. In the determination of the number average molecular weight Mn and the weight average molecular weight Mw, calibration curves were drawn using marketed monodisperse polystyrene standards and the conversion was made as described below.

Apparatus: gel permeation chromatograph Alliance GPC 2000 (manufactured by Waters)

Solvent: o-dichlorobenzene

Columns: TSK gel columns (manufactured by TOSOH CORPORATION)×4

Flow rate: 1.0 mL/min

Sample: 0.15 mg/mL o-dichlorobenzene solution

Temperature: 140° C.

Molecular weight conversion: PE conversion/general calibration method

In the general calibration method, the following Mark-Houwink coefficients were used:

Coefficient for polystyrene (PS): KPS=1.38×10$^{-4}$, $a$PS=0.70

Coefficient for polyethylene (PE): KPE=5.06×10$^{-4}$, $a$PE=0.70

(6) Measurement Method for 10% Weight Loss Temperature

The 10% weight loss temperature is a temperature which causes a 10% weight loss when 10 mg of a cyclic olefin wax was analyzed with a thermogravimeter (TG-DTA320 manufactured by SII). The TGA measurement was performed in an air atmosphere of 200 mL/min and at a temperature increasing rate of 20° C./min and a temperature range of 30° C. to 700° C.

Synthetic Example 1

Synthesis of Olefin Polymer Wax (B-1-1)

A 2 liter stainless steel autoclave that had been thoroughly purged with nitrogen was charged with 950 ml of hexane, 15 ml of propylene and 35 ml of vinylnorbornene (5-vinylbicyclo[2.2.1]hept-2-ene). Hydrogen was fed to 0.25 MPa (gauge pressure).

The temperature in the system was increased to 150° C. Polymerization was initiated by injecting with ethylene 0.3 mmol of triisobutylaluminum, 0.004 mmol of triphenylcarbenium tetrakis(pentafluorophenyl)borate and 0.02 mmol of (t-butylamide)dimethyl(tetramethyl-$\eta^5$-cyclopentadienyl) silanetitanium dichloride (manufactured by Sigma-Aldrich Co.). Thereafter, ethylene alone was continuously supplied to keep the total pressure at 2.9 MPa (gauge pressure). Polymerization was carried out at 150° C. for 20 minutes and was terminated by adding a small amount of ethanol to the system. Unreacted ethylene and vinylnorbornene were purged off. The polymer solution obtained was dried overnight at 100° C. and a reduced pressure.

An olefin polymer wax (B-1-1) was produced as described above. The olefin polymer wax had properties as shown in Table 1-1.

Synthetic Example 2

Synthesis of Olefin Polymer Wax (B-1-2)

A 2 liter stainless steel autoclave that had been thoroughly purged with nitrogen was charged with 945 ml of hexane, 5 ml of propylene and 50 ml of vinylnorbornene (5-vinylbicyclo[2.2.1]hept-2-ene). Hydrogen was fed to 0.25 MPa (gauge pressure).

The temperature in the system was increased to 150° C. Polymerization was initiated by injecting with ethylene 0.3 mmol of triisobutylaluminum, 0.004 mmol of triphenylcarbenium tetrakis(pentafluorophenyl) borate and 0.02 mmol of (t-butylamide)dimethyl(tetramethyl-$\eta^5$-cyclopentadienyl) silanetitanium dichloride (manufactured by Sigma-Aldrich Co.). Thereafter, ethylene alone was continuously supplied to keep the total pressure at 2.9 MPa (gauge pressure). Polymerization was carried out at 150° C. for 20 minutes and was terminated by adding a small amount of ethanol to the system. Unreacted ethylene and vinylnorbornene were purged off. The polymer solution obtained was dried overnight at 100° C. and a reduced pressure.

An olefin polymer wax (B-1-2) was produced as described above. The olefin polymer wax had properties as shown in Table 1-1.

Synthetic Example 3

Synthesis of Olefin Polymer Wax (B-1-3)

A 2 liter stainless steel autoclave that had been thoroughly purged with nitrogen was charged with 945 ml of hexane, 10 ml of propylene and 45 ml of vinylnorbornene (5-vinylbicyclo[2.2.1]hept-2-ene). Hydrogen was fed to 0.30 MPa (gauge pressure).

The temperature in the system was increased to 150° C. Polymerization was initiated by injecting with ethylene 0.3 mmol of triisobutylaluminum, 0.004 mmol of triphenylcarbenium tetrakis(pentafluorophenyl) borate and 0.02 mmol of (t-butylamide)dimethyl(tetramethyl-$\eta^5$-cyclopentadienyl) silanetitanium dichloride (manufactured by Sigma-Aldrich Co.). Thereafter, ethylene alone was continuously supplied to keep the total pressure at 2.9 MPa (gauge pressure). Polymerization was carried out at 150° C. for 20 minutes and was terminated by adding a small amount of ethanol to the system. Unreacted ethylene and vinylnorbornene were purged off. The polymer solution obtained was dried overnight at 100° C. and a reduced pressure.

An olefin polymer wax (B-1-3) was produced as described above. The olefin polymer wax had properties as shown in Table 1-1.

Synthetic Example 4

Synthesis of Olefin Polymer Wax (B-1'-4)

The olefin polymer wax (B-1-1) in an amount of 100 g was reacted with 8.3 g (5.6 equivalents relative to the cyclic olefin) of maleic acid anhydride at 200° C. for 5 hours. The resultant molten liquid was stirred at 200° C. and a reduced pressure, and unreacted maleic acid anhydride was purged off. The polymer obtained was dried overnight at 100° C. and a reduced pressure. An olefin polymer wax (B-1'-4) was produced as described above. The olefin polymer wax had properties as shown in Table 1-1.

Synthetic Example 5

Synthesis of Non-cyclic Olefin Polymer Wax (B-2-5))

A metal-modified ethylene/methacrylic acid copolymer (HIMILAN 1702 manufactured by DUPONT-MITSUI POLYCHEMICALS CO., LTD.) in an amount of 300 g was placed in a 500 ml branched polymerization flask. While nitrogen was passed through the flask, the polymer was heated to 400° C. using a sand bath. When the metal-modified ethylene/methacrylic acid copolymer was confirmed to be molten through the flask wall, the polymer was stirred at the temperature for 4 hours and was thereby thermally decomposed. The product was thereafter cooled to room temperature to give a thermal decomposition product of the metal-modified ethylene/methacrylic acid copolymer. A non-cyclic olefin wax (B-2-5) was produced as described above. The olefin wax had properties as shown in Table 1-2.

<Other Waxes>

Properties of other waxes (for example, non-cyclic olefin polymer waxes (B-2-1) to (B-2-4)) used in Comparative Examples and Examples are set forth in Table 1-2.

TABLE 1-1

|  | Synthetic Example 1 (B-1-1) | Synthetic Example 2 (B-1-2) | Synthetic Example 3 (B-1-3) | Synthetic Example 4 (B-1'-4) |
|---|---|---|---|---|
| Number of cyclic olefin units (units/1000 carbon atoms) | 8.6 | 11.6 | 9.8 | 11.6 |
| Number of α-olefin units (units/1000 carbon atoms) | 4.1 | 1.4 | 1.0 | 1.4 |
| Content of cyclic olefin units (units/molecule) | 1.1 | 1.5 | 0.7 | 1.5 |
| Density (kg/m$^3$) | 945 | 950 | 948 | — |
| Melting point (° C.) | 112 | 110 | 109 | 113 |
| Number average molecular weight Mn | 1800 | 1630 | 940 | 1550 |
| Weight average molecular weight Mw | 4680 | 4420 | 2538 | 4790 |
| Mw/Mn | 2.6 | 2.7 | 2.7 | 3.09 |
| Content (mol %) of units (b) derived from cyclic olefin | 1.8 | 2.5 | 2.1 | 1.8 |
| Content (mol %) of units (c) derived from C3-C20 olefin | 0.9 | 0.3 | 0.2 | 0.9 |
| T value | 416 | 430 | 344 | 407 |
| 0.002 × Mw + B | 329 | 329 | 325 | 330 |
| Weight loss at 200° C. (%) | 0.09 | 0.07 | 0.03 | 0.42 |
| Weight loss at 310° C. (%) | 2.4 | 1.9 | 10.8 | 1.65 |
| Weight loss at 330° C. (%) | 3.8 | 3.2 | 14.6 | 2.36 |

TABLE 1-2

|  | (B-2-1) (*1) | (B-2-2) (*2) | Ca montanate (*3) | (B-2-3) (*4) | (B-2-4) (*5) | Montanic acid ester (*6) | (B-2-5) (*7) |
|---|---|---|---|---|---|---|---|
| Number of cyclic olefin units (units/1000 carbon atoms) | — | — | — | — | — | — | — |
| Number of α-olefin units (units/1000 carbon atoms) | — | — | — | — | — | — | — |
| Content of cyclic olefin units (units/molecule) | — | — | — | — | — | — | — |
| Density (kg/m$^3$) | 920 | 970 | 930 | 920 | 940 | — | — |
| Melting point (° C.) | 113 | 129 | 85 | 109 | 107 | 78 | 89 |
| Number average molecular weight Mn | 4050 | 4060 | 730 | 630 | 820 | 993 | 2170 |
| Weight average molecular weight Mw | 11700 | 12700 | 850 | 1220 | 1930 | 1270 | 4420 |
| Mw/Mn | 2.9 | 3.1 | 1.2 | 1.94 | 2.35 | 1.28 | 2.04 |
| Content (mol %) of units (b) derived from cyclic olefin | — | — | — | — | — | — | — |
| Content (mol %) of units (c) derived from C3-C20 olefin | — | — | — | — | — | — | — |
| T value | 334 | 341 | 410 | 293 | 310 | 296 | 367 |
| 0.002 × Mw + B | 343 | 345 | 322 | 322 | 324 | 323 | 329 |
| Weight loss at 200° C. (%) | 0.13 | 0.10 | 1.82 | 0.11 | 0.65 | 0.31 | 0.3 |
| Weight loss at 310° C. (%) | 5.1 | 3.9 | 4.2 | 17 | 10.2 | 11.4 | 2.7 |
| Weight loss at 330° C. (%) | 9.1 | 7.6 | 5.1 | 27.6 | 16.5 | 24 | 5.11 |

(*1) Ethylene/propylene copolymer wax, Hi-wax 720P (manufactured by Mitsui Chemicals, Inc.)
(*2) Polyethylene wax, Hi-wax 800P (manufactured by Mitsui Chemicals, Inc.)
(*3) Calcium montanate, Licomont CaV102 (manufactured by Clariant)
(*4) Polyethylene wax, Hi-wax 110P (manufactured by Mitsui Chemicals, Inc.)
(*5) Polyethylene wax, Hi-wax 1105P (manufactured by Mitsui Chemicals, Inc.)
(*6) Montanic acid ester, Licowax E (manufactured by Clariant)
(*7) Ionomer resin in which ethylene/methacrylic acid copolymer molecules were bridged with metal ions, HIMILAN 1702 (manufactured by DUPONT-MITSUI POLYCHEMICALS CO., LTD.)

Example 1

The olefin polymer wax (B-1-1) in an amount of 0.5 part by weight was added to 90 parts by weight of a polycarbonate resin (Panlite L-1225Y NAT manufactured by TEIJIN CHEMICALS LTD., Tm=approximately 250° C., Tg=145-150° C.) containing 10 parts by weight of glass fibers (CS 3PE-4555 manufactured by Nitto Boseki Co., Ltd.). The mixture was melt-kneaded with use of a twin-screw extruder (co-rotating twin-screw extruder HK-25D (41D) manufactured by PARKER CORPORATION) into strands (cylinder temperature: 280° C., feed: 10.0 kg/hr). The strands were evaluated for smoking, strand stability, color hue and heat resistance of color hue as described below. Pellets prepared from the strands were dried at 120° C. for 5 hours and were injection molded with an injection molding machine (Klockner F85 manufactured by Klockner) at a cylinder temperature of 290° C., a screw rotation of 100 rpm, an injection primary pressure of 70 MPa, a secondary pressure of 50 MPa and a mold temperature of 90° C., thereby preparing test pieces in accordance with a JIS testing method. Mechanical properties, in detail flexural elastic modulus, of the test pieces was evaluated as described below. The results are set forth in Table 2-1.

[Evaluation Methods for Shaping Processability and Shaped Articles]

Measurements and evaluations were performed by the following methods in Example 1 and other Examples and Comparative Examples.

<Torque>

The load applied to the screws of the extruder was measured with a torque meter attached to the twin-screw extruder.

<Smoking>

The amount of smoke discharged from the extruder outlet was visually observed. The evaluation grade AA indicates substantially no smoking, BB indicates slight smoking, and CC indicates heavy smoking.

<Strand Stability>

The strand stability was evaluated to be AA when strand breakage occurred less than 5 times during 20 minutes of the strand production, and was evaluated CC when strand breakage occurred 5 or more times.

<Color Hue>

The color hue of the strands was observed. The color hue was evaluated AA when the strands had not been yellowed, and was evaluated CC when the strands had been yellowed.

<Heat Resistance of Color Hue>

The strands were heated at 180° C. for 10 hours, and the color hue thereof was visually observed. The heat resistance of color hue was evaluated AA when the color hue had slight change, and was evaluated CC when the color hue changed greatly.

<Flexural Elastic Modulus>

The test piece prepared with the injection molding machine was tested in accordance with JIS K-7171 under a load range of 50 kg, a testing speed of 2 mm/min and a bending span of 64 mm to determine the flexural elastic modulus.

Example 2

A polycarbonate resin composition was prepared and properties thereof were evaluated in the same manner as in Example 1, except that the olefin polymer wax (B-1-1) was replaced by 0.5 part by weight of the olefin polymer wax (B-1-2). The results are set forth in Table 2-1.

Example 3

A polycarbonate resin composition was prepared and properties thereof were evaluated in the same manner as in Example 1, except that the olefin polymer wax (B-1-1) was replaced by 0.5 part by weight of the olefin polymer wax (B-1-3). The results are set forth in Table 2-1.

Comparative Example 1

A polycarbonate resin composition was prepared and properties thereof were evaluated in the same manner as in Example 1, except that the releasing agent (the olefin polymer wax (B-1-1)) was not used. The results are set forth in Table 2-1.

Comparative Example 2

A polycarbonate resin composition was prepared and properties thereof were evaluated in the same manner as in Example 1, except that the olefin polymer wax (B-1-1) was replaced by 0.5 part by weight of the olefin polymer wax (B-2-4) (Hi-wax 1105A manufactured by Mitsui Chemicals, Inc.). The results are set forth in Table 2-1.

Comparative Example 3

A polycarbonate resin composition was prepared and properties thereof were evaluated in the same manner as in Example 1, except that the olefin polymer wax (B-1-1) was replaced by 0.5 part by weight of the olefin polymer wax (B-2-3) (Hi-wax 110P manufactured by Mitsui Chemicals, Inc.). The results are set forth in Table 2-1.

The results in [Example 1] to [Comparative Example 3] showed that the use of the olefin polymer waxes (B-1) allowed for good shaping properties (low torque) while maintaining smoking inhibition, strand stability, color hue, heat resistance of color hue and flexural elastic modulus.

Example 4

The olefin polymer wax (B-1-1) in an amount of 0.5 part by weight was added to 100 parts by weight of a polycarbonate resin (Panlite L-1225Y NAT manufactured by TEIJIN CHEMICALS LTD., Tm=approximately 225° C., Tg=50° C.). The mixture was melt-kneaded with use of a twin-screw extruder (co-rotating twin-screw extruder HK-25D (41D) manufactured by PARKER CORPORATION) into strands (cylinder temperature: 280° C., feed: 10.0 kg/hr). Pellets prepared from the strands were evaluated for mold-releasing force as follows. The polycarbonate resin composition that had been molten by heating at 290° C. was isobarically cooled to 100° C. at a rate of 5° C./min under a pressure of 20 MPa using a PVT apparatus (PVT-100 manufactured by SWO). The extrusion pressure required for an ascending piston to release the sample was measured. The results are set forth in Table 2-2.

Example 5

A polycarbonate resin composition was prepared and properties thereof were evaluated in the same manner as in Example 4, except that the olefin polymer wax (B-1-1) was replaced by 0.5 part by weight of the olefin polymer wax (B-1-4'). The results are set forth in Table 2-2.

Comparative Example 4

A polycarbonate resin composition was prepared and properties thereof were evaluated in the same manner as in Example 4, except that the releasing agent (the olefin polymer wax (B-1-1)) was not used. The results are set forth in Table 2-2.

Comparative Example 5

A polycarbonate resin composition was prepared and properties thereof were evaluated in the same manner as in Example 4, except that the olefin polymer wax (B-1-1) was replaced by 0.5 part by weight of the olefin polymer wax (B-2-4). The results are set forth in Table 2-2.

Comparative Example 6

A polycarbonate resin composition was prepared and properties thereof were evaluated in the same manner as in Example 4, except that the olefin polymer wax (B-1-1) was replaced by 0.5 part by weight of the olefin polymer wax (B-2-3). The results are set forth in Table 2-2.

TABLE 2-1

|  |  | Ex. 1 | Ex. 2 | Ex. 3 | Comp. Ex. 1 | Comp. Ex. 2 | Comp. Ex. 3 |
|---|---|---|---|---|---|---|---|
|  | Wax | (B-1-1) | (B-1-2) | (B-1-3) | None | (B-2-4) 1105A | (B-2-3) 110P |
| PC/GF resin composition | Amount of wax added (parts by weight) | 0.5 | 0.5 | 0.5 | 0 | 0.5 | 0.5 |
| Evaluation items | Torque (N · m) | 105 | 107 | 100 | 120< | 104 | 103 |
|  | Smoking | AA | AA | AA | AA | CC | CC |
|  | Strand stability | AA | AA | AA | AA | AA | AA |
|  | Color hue | AA | AA | AA | AA | CC | CC |
|  | Heat resistance of color hue | BB | BB | BB | AA | CC | CC |
|  | Flexural elastic modulus (MPa) | 3600 | 3600 | 3600 | 3600 | 3600 | 3600 |

TABLE 2-2

|  |  | Ex. 4 | Ex. 5 | Comp. Ex. 4 | Comp. Ex. 5 | Comp. Ex. 6 |
|---|---|---|---|---|---|---|
|  | Wax | (B-1-1) | (B-1'-4) | None | (B-2-4) 1105A | (B-2-3) 110P |
| PC | Amount of wax added (parts by weight) | 0.5 | 0.5 | 0 | 0.5 | 0.5 |
| Evaluation item | Mold-releasing force (Bar) | 828 | 478 | 1146 | 733 | 792 |

Example 6

Pellets were prepared by melt-kneading in a twin-screw extruder 44.35 parts by weight of a semi-aromatic polyamide (PA6T/66 manufactured by Mitsui Chemicals, Inc., melting point: 320° C., [η]: 0.8, Tm: approximately 320° C., Tg: 95° C.), 30 parts by weight of glass fibers (ESC03-615 manufactured by Central Glass Co., Ltd.), 21 parts by weight of brominated polystyrene (PBS-64HW manufactured by Chemtura Japan Ltd.) as a flame-retardant, 2 parts by weight of sodium antimonate (SA-A manufactured by NIHON SEIKO CO., LTD.) as a flame-retardant auxiliary, 0.3 part by weight of hydrotalcite (DHT-4C manufactured by Kyowa Chemical Industry Co., Ltd.) as a halogen catcher, 1.4 parts by weight of maleinized SEGS (TUFTEC M1913 manufactured by Asahi Kasei Corporation) as an anti-drip agent at burning, 0.7 part by weight of talc (ET-5 manufactured by Matsumura Sangyo K.K.) as a crystal nucleating agent, and 0.25 part by weight of the olefin polymer wax (B-1-1) as a releasing agent. The pellets of the polyamide resin composition were evaluated as described in Example 1 and also by the following methods. The results are set forth in Table 3.

[Evaluation Methods for Shaping Processability and Shaped Articles]

In Example 6 and Comparative Examples 7 to 9, measurements and evaluations were carried out as follows.

<Thin-wall Flow Length Test>

The polyamide resin composition was injected at a cylinder temperature that was 10° C. higher than the melting point of the polyamide resin and an injection rate of 200 mm/sec, into a bar flow mold 10 mm in width and 0.5 mm in thickness which had been set at a mold temperature of 135° C. with use of TUPARL TR40S3A manufactured by Sodick Plustech Co., Ltd. The first 20 shots were discarded, and the flow length (mm) of the next 10 shots was measured and averaged.

<Vent Obstruction>

The polyamide resin composition was injected at a cylinder temperature that was 10° C. higher than the melting point of the polyamide resin and an injection rate of 150 mm/sec, into a rectangular mold 20 mm in width, 40 mm in length and 3 mm in height which had a gas vent 20 mm in width, 2 mm in land length and 10 μm in depth and which had been set at a mold temperature of 135° C. with use of TUPARL TR40S3A manufactured by Sodick Plustech Co., Ltd. The number of shots was counted until the mold deposit obstructed the gas vent and the test piece was burnt by gas.

<Mold-releasing Force>

The polyamide resin composition was injected at a cylinder temperature that was 10° C. higher than the melting point of the polyamide resin, an injection pressure of 50% and an injection rate of 30%, into a connector mold which had been set at a mold temperature of 100° C. with use of PS-40E manufactured by Nissei Plastic Industrial Co., Ltd. The mold-releasing force was determined with DLA (data logger analyzer) manufactured by the same company.

Comparative Example 7

A polyamide resin composition was prepared and properties thereof were evaluated in the same manner as in Example 6, except that the releasing agent (the olefin polymer wax (B-1-1)) was not used. The results are set forth in Table 3.

Comparative Example 8

A polyamide resin composition was prepared and properties thereof were evaluated in the same manner as in Example 6, except that the olefin polymer wax (B-1-1) was replaced by the olefin polymer wax (B-2-2) (Hi-wax 800P manufactured by Mitsui Chemicals, Inc.). The results are set forth in Table 3.

Comparative Example 9

A polyamide resin composition was prepared and properties thereof were evaluated in the same manner as in Example 6, except that the olefin polymer wax (B-1-1) was replaced by calcium montanate (Licomont CaV102 manufactured by Clariant). The results are set forth in Table 3.

The results obtained above showed that the use of the olefin polymer wax (B-1) allowed for good shaping properties (low torque) and excellent properties shown in Table 3 while maintaining smoking inhibition, strand stability, color hue, heat resistance of color hue and flexural elastic modulus.

TABLE 3

| Wax | | Ex. 6 (B-1-1) | Comp. Ex. 7 None | Comp. Ex. 8 (B-2-2) 800 P | Comp. Ex. 9 Ca montanate (Licomont CaV102) |
|---|---|---|---|---|---|
| Amount of wax added (parts by weight) | | 0.25 | 0 | 0.25 | 0.25 |
| Thin-wall flow length (0.5 mm) | mm | 55 | 50 | 55 | 56 |
| Vent obstruction | shots | 130 | 130 | 125 | 121 |
| Mold-releasing force | kg/cm$^2$ | 59 | 65 | 55 | 49 |

Example 7

The olefin polymer wax (B-1-1) in an amount of 0.5 part by weight was added to 100 parts by weight of polyamide 6 (UBE nylon 1015B manufactured by UBE INDUSTRIES, LTD., Tm: approximately 225° C., Tg: 50° C.). The mixture was melt-kneaded with a twin-screw extruder (co-rotating twin-screw extruder HK-25D (41D) manufactured by PARKER CORPORATION) into strands (cylinder temperature: 240° C., feed: 10.0 kg/hr). The strands were evaluated for smoking, strand stability, color hue and heat resistance of color hue as described hereinabove. Further, the torque was measured as described hereinabove. Furthermore, the following evaluations were performed. The results are set forth in Table 4.

[Evaluation Methods for Shaping Processability and Shaped Articles]

In Examples 7 to 9 and Comparative Examples 10 to 14, measurements and evaluations were carried out as follows.

<Floating Matters>

The strands discharged to an extruder water bath were visually observed. When substantially no floating matters were generated from the strands, the strands were evaluated AA. When floating matters were observed, the strands were evaluated CC.

<Mold-releasing Force>

The polyamide resin composition was injected at a cylinder temperature of 250° C., an injection pressure of 16 to 23% and an injection rate of 20%, into a cup mold which had been set at a mold temperature of about 80° C. with use of Klockner F-85 (manufactured by Klockner Ferromatik). The mold-releasing force was determined with MOBAC 100 manufactured by Nireco Corporation.

<Appearance of Shaped Articles>

The color hue of the shaped articles fabricated for the above measurement of mold-releasing force was observed. The appearance was evaluated AA when the shaped articles had not been yellowed, and was evaluated CC when the shaped articles had been yellowed.

Example 8

A polyamide resin composition was prepared and properties thereof were evaluated in the same manner as in Example 7, except that 0.5 part by weight of the olefin polymer wax (B-1-1) was changed to 3 parts by weight of the olefin polymer wax (B-1-1). The results are set forth in Table 4.

Example 9

A polyamide resin composition was prepared and properties thereof were evaluated in the same manner as in Example 7, except that the olefin polymer wax (B-1-1) was replaced by the olefin polymer wax (B-1'-4). The results are set forth in Table 4.

Comparative Example 10

A polyamide resin composition was prepared and properties thereof were evaluated in the same manner as in Example 7, except that the releasing agent (the olefin polymer wax (B-1-1)) was not used. The results are set forth in Table 4.

Comparative Example 11

A polyamide resin composition was prepared and properties thereof were evaluated in the same manner as in Example 7, except that the olefin polymer wax (B-1-1) was replaced by the Ca montanate. The results are set forth in Table 4.

Comparative Example 12

A polyamide resin composition was prepared and properties thereof were evaluated in the same manner as in Example 7, except that the olefin polymer wax (B-1-1) was replaced by the montanic acid ester. The results are set forth in Table 4.

Comparative Example 13

A polyamide resin composition was prepared and properties thereof were evaluated in the same manner as in Example 7, except that the olefin polymer wax (B-1-1) was replaced by the olefin polymer wax (B-2-2). The results are set forth in Table 4.

Comparative Example 14

A polyamide resin composition was prepared and properties thereof were evaluated in the same manner as in Example 7, except that the olefin polymer wax (B-1-1) was replaced by the olefin polymer wax (B-2-5). The results are set forth in Table 4.

TABLE 4

|  |  | Ex. 7 | Ex. 8 | Ex. 9 | Comp. Ex. 10 | Comp. Ex. 11 | Comp. Ex. 12 | Comp. Ex. 13 | Comp. Ex. 14 |
|---|---|---|---|---|---|---|---|---|---|
| PA 6 (neat) resin composition | Wax | (B-1-1) | (B-1-1) | (B-1'-4) | None | Ca montanate | Montanic acid ester | (B-2-2) 800P | (B-2-5) HIMILAN |
|  | Amount of wax added (parts by weight) | 0.5 | 3 | 0.5 | 0 | 0.5 | 0.5 | 0.5 | 0.5 |
| Evaluation items | Torque (N · m) | 90 | 56 | 97 | 109 | 101 | 97 | 98 | 97 |
|  | Smoking | AA | AA | AA | AA | AA | CC | AA | AA |
|  | Strand stability | AA | AA | AA | AA | AA | AA | AA | AA |
|  | Color hue | AA | AA | AA | AA | CC | CC | AA | AA |
|  | Heat resistance of color hue | AA | AA | BB | CC | CC | CC | AA | AA |
|  | Floating matters | AA | AA | AA | AA | AA | CC | AA | AA |
|  | Mold-releasing force (MPa) | 5.5 | 5.9 | 11.7 | 44 | 7.1 | 4.7 | 42 | 30 |
|  | Shaped article appearance | Good | Good | Good | Broken | Colored | Colored, sticky | Broken or deformed | Good |

Example 10

To 100 parts by weight of polyamide 6 (UBE nylon 1015B manufactured by UBE INDUSTRIES, LTD., Tm: approximately 225° C., Tg: 50° C.), there were added 30 parts by weight of glass fibers (CSX3J451S manufactured by Nitto Boseki Co., Ltd.) and 0.5 part by weight of the olefin polymer wax (B-1-1). The mixture was melt-kneaded with a twin-screw extruder (co-rotating twin-screw extruder HK-25D (41D) manufactured by PARKER CORPORATION) into strands (cylinder temperature: 240° C., feed: 10.0 kg/hr). The strands were evaluated for smoking, strand stability, color hue and heat resistance of color hue as described hereinabove. Further, the torque was measured as described hereinabove. Pellets prepared from the strands were dried at 80° C. for 12 hours and were injection molded with an injection molding machine (Klockner F85 manufactured by Klockner) at a cylinder temperature of 250° C., a screw rotation of 100 rpm, an injection primary pressure of approximately 30 MPa, a secondary pressure of approximately 25 MPa and a mold temperature of 80° C., thereby preparing test pieces in accordance with a JIS testing method. Mechanical properties, in detail flexural elastic modulus and Charpy impact strength, of the test pieces were evaluated. Furthermore, the following evaluations were carried out. The results are set forth in Table 5-1.
[Evaluation Methods for Shaping Processability and Shaped Articles]
In Examples 10 to 14 and Comparative Examples 15 to 18, measurements and evaluations were carried out as follows.
<Flexural Elastic Modulus>
The flexural elastic modulus was determined in accordance with JIS K-7162.
<Charpy Impact Strength>
The impact value was determined in accordance with JIS K-7111.
<Mold-releasing Force>
The polyamide resin composition was injected at a cylinder temperature of 250° C., an injection pressure of 16 to 23% and an injection rate of 20%, into a cup mold which had been set at a mold temperature of about 80° C. with use of Klockner F-85 (manufactured by Klockner Ferromatik). The mold-releasing force was determined with MOBAC 100 manufactured by Nireco Corporation.
<Appearance of Shaped Articles>
The color hue of the shaped articles fabricated for the above measurement of mold-releasing force was observed. The appearance was evaluated AA when the shaped articles had not been yellowed, and was evaluated CC when the shaped articles had been yellowed.

Example 11

A polyamide resin composition was prepared and properties thereof were evaluated in the same manner as in Example 10, except that 0.5 part by weight of the olefin polymer wax (B-1-1) was changed to 1 part by weight of the olefin polymer wax (B-1-1). The results are set forth in Table 5-1.

Example 12

A polyamide resin composition was prepared and properties thereof were evaluated in the same manner as in Example 10, except that 0.5 part by weight of the olefin polymer wax (B-1-1) was changed to 3 parts by weight of the olefin polymer wax (B-1-1). The results are set forth in Table 5-1.

Example 13

A polyamide resin composition was prepared and properties thereof were evaluated in the same manner as in Example 10, except that the olefin polymer wax (B-1-1) was replaced by the olefin polymer wax (B-1'-4). The results are set forth in Table 5-1.

Example 14

A polyamide resin composition was prepared and properties thereof were evaluated in the same manner as in Example 10, except that 0.5 part by weight of the olefin polymer wax (B-1-1) was replaced by 0.25 part by weight of the olefin polymer wax (B-1-1) and 0.25 part by weight of the olefin polymer wax (B-2-5) (total: 0.5 part by weight). The results are set forth in Table 5-1.

Comparative Example 15

A polyamide resin composition was prepared and properties thereof were evaluated in the same manner as in Example 10, except that the releasing agent (the olefin polymer wax (B-1-1)) was not used. The results are set forth in Table 5-1. The surface of the shaped articles had irregularities.

Comparative Example 16

A polyamide resin composition was prepared and properties thereof were evaluated in the same manner as in Example 10, except that the olefin polymer wax (B-1-1) was replaced by the Ca montanate. The results are set forth in Table 5-1. The surface of the shaped articles had irregularities.

Comparative Example 17

A polyamide resin composition was prepared and properties thereof were evaluated in the same manner as in Example 10, except that the olefin polymer wax (B-1-1) was replaced by the montanic acid ester. The results are set forth in Table 5-1. The surface of the shaped articles had irregularities.

Reference Example 1

A polyamide resin composition was prepared and properties thereof were evaluated in the same manner as in Example 10, except that the olefin polymer wax (B-1-1) was replaced by the olefin polymer wax (B-2-5). The results are set forth in Table 5-2. The surface of the shaped articles had high smoothness.

Reference Examples 2 and 3

Polyamide resin compositions were prepared and properties thereof were evaluated in the same manner as in Reference Example 1, except that the amount of the olefin polymer wax (B-2-5) was changed as shown in Table 5-2. The results are set forth in Table 5-2. The surface of the shaped articles had high smoothness.

TABLE 5-1

|  |  | Ex. 10 | Ex. 11 | Ex. 12 | Ex. 13 | Ex. 14 | Comp. Ex. 15 | Comp. Ex. 16 | Comp. Ex. 17 |
|---|---|---|---|---|---|---|---|---|---|
|  | Wax | (B-1-1) | (B-1-1) | (B-1-1) | (B-1'-4) | (B-2-5) HIMILAN/ (B-1-1) | None | Ca montanate | Montanic acid ester |
| PA 6/GF resin composition | Amount of wax added (parts by weight) | 0.5 | 1 | 3 | 0.5 | 0.5 | 0 | 0.5 | 0.5 |
| Evaluation items | Torque (N · m) | 101 | 95 | 66 | 106 |  | 116 | 101 | 107 |
|  | Smoking | AA | AA | AA | AA | AA | AA | AA | CC |
|  | Strand stability | AA | AA | AA | AA | AA | AA | AA | AA |
|  | Color hue | AA | AA | AA | AA | AA | AA | AA | CC |
|  | Heat resistance of color hue | AA | AA | CC | CC | AA | CC | CC | CC |
|  | Flexural elastic modulus (MPa) | 8322 | — | — | — | — | 8394 | 8488 | 8440 |
|  | Charpy impact strength (kJ/m$^2$) | 14.4 | — | — | — | — | 13.7 | 13.6 | 12.5 |
|  | Mold-releasing force (MPa) | 19.4 | 9.5 | 2.9 | 12 | 8.4 | 29.3 | 9.1 | 9.9 |
|  | Shaped article appearance | Good | Good | Slightly colored | Good | Good | Good | Colored | Colored |
|  | Surface smoothness | — | — | — | — | — | — | — | — |

TABLE 5-2

|  |  | Ref. Ex. 1 (B-2-5) HIMILAN | Ref. Ex. 2 (B-2-5) HIMILAN | Ref. Ex. 3 (B-2-5) HIMILAN |
|---|---|---|---|---|
|  | Wax |  |  |  |
| PA 6/GF resin composition | Amount of wax added (parts by weight) | 0.5 | 1 | 3 |
| Evaluation items | Torque (N · m) | 108 | 103 | 77 |
|  | Smoking | AA | AA | AA |
|  | Strand stability | AA | AA | AA |
|  | Color hue | AA | AA | CC |
|  | Heat resistance of color hue | CC | CC | CC |
|  | Flexural elastic modulus (MPa) | 8277 | — | 8198 |
|  | Charpy impact strength (kJ/m$^2$) | 14.7 | — | 14.89 |
|  | Mold-releasing force (MPa) | 9.9 | 9.4 | 10.5 |
|  | Shaped article appearance | Good | Good | Colored |
|  | Surface smoothness | Good | Good | Good |

The invention claimed is:

1. A resin composition (X) obtained by blending a resin (A) having a melting point Tm of not less than 200° C. and an olefin polymer wax component (B),
   the olefin polymer wax component (B) comprising a cyclic olefin polymer wax (B-1) comprising structural units (a) and (b) described below, the cyclic olefin polymer wax (B-1) containing the structural units (b) at 0.2 to 10 mol % based on all the structural units in the polymer;
   (a) units derived from ethylene
   (b) units derived from a cyclic olefin
   and further comprising a metal salt wax of an ethylene/(meth)acrylic acid copolymer (B-2), wherein the ratio of the cyclic olefin polymer wax (B-1) and the metal salt wax of an ethylene/(meth)acrylic acid copolymer (B-2) is 10:90 to 99:1 (wt %).

2. The resin composition (X) according to claim 1, wherein the cyclic olefin polymer wax (B-1) further comprises structural units (c) described below and contains the structural units (c) at 0.01 to 15 mol % based on all the structural units in the polymer;
   (c) units derived from a linear or branched C3-C20 olefin.

3. The resin composition (X) according to claim 1, wherein the olefin polymer wax component (B) is blended at 0.01 to 10 parts by weight based on 100 parts by weight of the resin (A).

4. The resin composition (X) according to claim 1, wherein the cyclic olefin polymer wax (B-1) satisfies (Bi) to (Bv) below:

(Bi) the content of the units derived from a cyclic olefin is 0.1 to 4.0 units per molecule of the polymer;
(Bii) the density is in the range of 870 to 980 kg/m³;
(Biii) the melting point is in the range of 70 to 130° C.;
(Biv) the number average molecular weight is in the range of 400 to 5,000;
(Bv) the ratio of the weight average molecular weight (Mw) to the number average molecular weight (Mn), (Mw/Mn), is not more than 4.0.

5. The resin composition (X) according to claim 4, wherein the cyclic olefin polymer wax (B-1) further satisfies (Bvi) below:
(Bvi) the 10% weight loss temperature T according to TGA is not less than 350° C., or the 10% weight loss temperature T according to TGA and the weight average molecular weight Mw satisfy Formula (I) below:

$$T \geq 0.002 \times Mw + B \quad (I)$$

(wherein the value B (° C.) is 320).

6. The resin composition (X) according to claim 1, wherein the structural units (b) in the cyclic olefin polymer wax (B-1) are units (b') derived from a cyclic polyene.

7. The resin composition (X) according to claim 1, wherein the olefin polymer wax component (B) comprises a cyclic olefin polymer wax (B-1') obtained by modifying the cyclic olefin polymer wax (B-1), and
wherein the cyclic olefin polymer wax (B-1') comprises structural units (a) and (b") below wherein the content of the structural units (b") is 0.2 to 10 mol % based on all the structural units in the polymer:
(a) units derived from ethylene
(b") units which are derived from a cyclic olefin and in which an unsaturated group has been modified; and
the cyclic olefin polymer wax satisfies (Bi') below:
(Bi') the content of the units derived from a cyclic olefin is 0.1 to 4.0 units per molecule of the polymer.

8. The resin composition (X) according to claim 7, wherein the cyclic olefin polymer wax (B-1') further satisfies (Bvi') below:
(Bvi') the 10% weight loss temperature T according to TGA is not less than 350° C., or the 10% weight loss temperature T according to TGA and the weight average molecular weight Mw satisfy Formula (I) below:

$$T \geq 0.002 \times Mw + B \quad (I)$$

(wherein the value B (° C.) is 320).

9. The resin composition (X) according to claim 7, wherein the structural units (b") are units (b''') which are derived from a cyclic polyene and in which an unsaturated group has been acid-modified.

10. The resin composition (X) according to claim 1, wherein the metal salt wax of an ethylene/(meth)acrylic acid copolymer (B-2) has a number average molecular weight in the range of 500 to 5,000.

11. The resin composition (X) according to claim 1, wherein the metal in the metal salt wax is at least one selected from K, Na, Ca and Zn.

12. The resin composition (X) according to claim 1, wherein the resin (A) has Tg in the range of 0 to 500° C.

13. The resin composition (X) according to claim 1, wherein the resin (A) is selected from polyamides and polycarbonates.

14. The resin composition (X) according to claim 1, which further comprises an inorganic reinforcing material (E) in an amount of 5 to 250 parts by weight based on 100 parts by weight of the resin (A).

15. A shaped article produced from the resin composition (X) described in claim 1.

* * * * *